(12) United States Patent
Bjorkegren

(10) Patent No.: US 9,715,482 B1
(45) Date of Patent: Jul. 25, 2017

(54) REPRESENTING CONSUMPTION OF DIGITAL CONTENT

(75) Inventor: Michael Erik Carl Bjorkegren, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 385 days.

(21) Appl. No.: 13/534,921

(22) Filed: Jun. 27, 2012

(51) Int. Cl.
*G06F 3/01* (2006.01)
*G06F 17/21* (2006.01)
*G06F 17/22* (2006.01)
*G06F 17/24* (2006.01)

(52) U.S. Cl.
CPC .......... *G06F 17/211* (2013.01); *G06F 17/21* (2013.01); *G06F 17/2247* (2013.01); *G06F 17/24* (2013.01)

(58) Field of Classification Search
CPC .... G06F 17/211; G06F 17/2247; G06F 17/21; G06F 17/24
USPC ................. 715/201, 859, 860, 857, 862, 273
See application file for complete search history.

(56) References Cited

U.S. PATENT DOCUMENTS

| | | | |
|---|---|---|---|
| 8,402,385 B1 | 3/2013 | Clark | |
| 8,692,763 B1 * | 4/2014 | Kim | G09G 3/3453 345/156 |
| 2004/0125124 A1 * | 7/2004 | Kim | G06F 17/30799 715/716 |
| 2006/0045470 A1 | 3/2006 | Poslinski et al. | |
| 2006/0256083 A1 * | 11/2006 | Rosenberg | 345/156 |
| 2007/0055926 A1 * | 3/2007 | Christiansen et al. | 715/512 |
| 2008/0163039 A1 * | 7/2008 | Ryan et al. | 715/206 |
| 2008/0168359 A1 * | 7/2008 | Flick et al. | 715/748 |
| 2010/0023259 A1 * | 1/2010 | Krumm et al. | 701/208 |
| 2010/0241961 A1 * | 9/2010 | Peterson et al. | 715/720 |
| 2012/0216118 A1 * | 8/2012 | Lin | H04N 21/234327 715/716 |
| 2012/0311438 A1 | 12/2012 | Cranfill et al. | |

OTHER PUBLICATIONS

Office Action for U.S. Appl. No. 13/534,507, mailed on Apr. 6, 2015, Michael Erik Carl Bjorkegren, "Sampling a Part of a Content Item", 12 pages.
Office action for U.S. Appl. No. 13/534,507, mailed on Dec. 17, 2015, Bjorkegren, "Sampling a Part of a Content Item", 15 pages.

(Continued)

*Primary Examiner* — Scott Baderman
*Assistant Examiner* — Hassan Mrabi
(74) *Attorney, Agent, or Firm* — Lee & Hayes, PLLC

(57) ABSTRACT

In some implementations, a user may use an electronic device to consume content of a content item in a non-linear or noncontiguous manner. The electronic device may display a consumption representation in connection with the content item. The consumption representation may represent locations of portions of content of the content item that have been consumed. In addition, the electronic device may track the consumption of the content using various techniques for determining whether a particular portion of content is likely to have been consumed. In some examples, the consumption representation may be displayed with an indicator to indicate the presence of embedded content that may be provided with certain content items. The indicator of embedded content may further indicate information such as a location, a content type, and/or a consumption status of the embedded content.

27 Claims, 24 Drawing Sheets

(56) References Cited

OTHER PUBLICATIONS

Office action for U.S. Appl. No. 13/534,507, mailed on Aug. 8, 2016, Bjorkegren, "Sampling a Part of a Content Item", 15 pages.
Office action for U.S. Appl. No. 13/534,507, mailed on Mar. 30, 2016, Bjorkegren, "Sampling a Part of a Content Item", 14 pages.

* cited by examiner

3900 ─┐

```
┌─────────────────────────────────────────────────────────┐
│  RECEIVE, FROM A PLURALITY OF DEVICES ASSOCIATED WITH A │
│   PLURALITY OF DIFFERENT USER ACCOUNTS, CONSUMPTION     │
│  INFORMATION IDENTIFYING CONSUMPTION OF NONCONTIGUOUS   │
│        PORTIONS OF CONTENT OF A CONTENT ITEM            │
│                          3902                           │
└─────────────────────────────────────────────────────────┘
                             │
                             ▼
┌─────────────────────────────────────────────────────────┐
│   COMPARE THE CONSUMPTION INFORMATION RECEIVED FROM THE │
│   PLURALITY OF DEVICES TO DETERMINE ONE OR MORE PORTIONS│
│   OF CONTENT OF THE CONTENT ITEM THAT HAVE BEEN CONSUMED│
│     MORE FREQUENTLY THAN OTHER PORTIONS OF THE CONTENT  │
│                          3904                           │
└─────────────────────────────────────────────────────────┘
                             │
                             ▼
┌─────────────────────────────────────────────────────────┐
│  PRESENT A REPRESENTATION OF AGGREGATED CONSUMPTION     │
│  INFORMATION FOR THE CONTENT ITEM INDICATING AT LEAST   │
│  ONE PORTION OF CONTENT CONSUMED MORE FREQUENTLY THAN   │
│             OTHER PORTIONS OF THE CONTENT               │
│                          3906                           │
└─────────────────────────────────────────────────────────┘
```

FIG. 39

REPRESENTING CONSUMPTION OF DIGITAL CONTENT

BACKGROUND

The continued proliferation of digital content items has led to an increase in the availability of such content items, as well as an increase in the availability of electronic devices and applications used for consuming these content items. For instance, users consume content items, such as electronic books (eBooks), digital videos, digital songs, digital images, and the like, on an assortment of electronic devices. As the number of content items and devices for consuming content items continues to increase, users are ever more interested in enhancing their experiences while consuming digital content.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 39 is a flow diagram illustrating an example process that may be executed by a computing device of a content provider in connection with providing aggregated consumption information for a content item according to some implementations herein.

DETAILED DESCRIPTION

Figure 1:
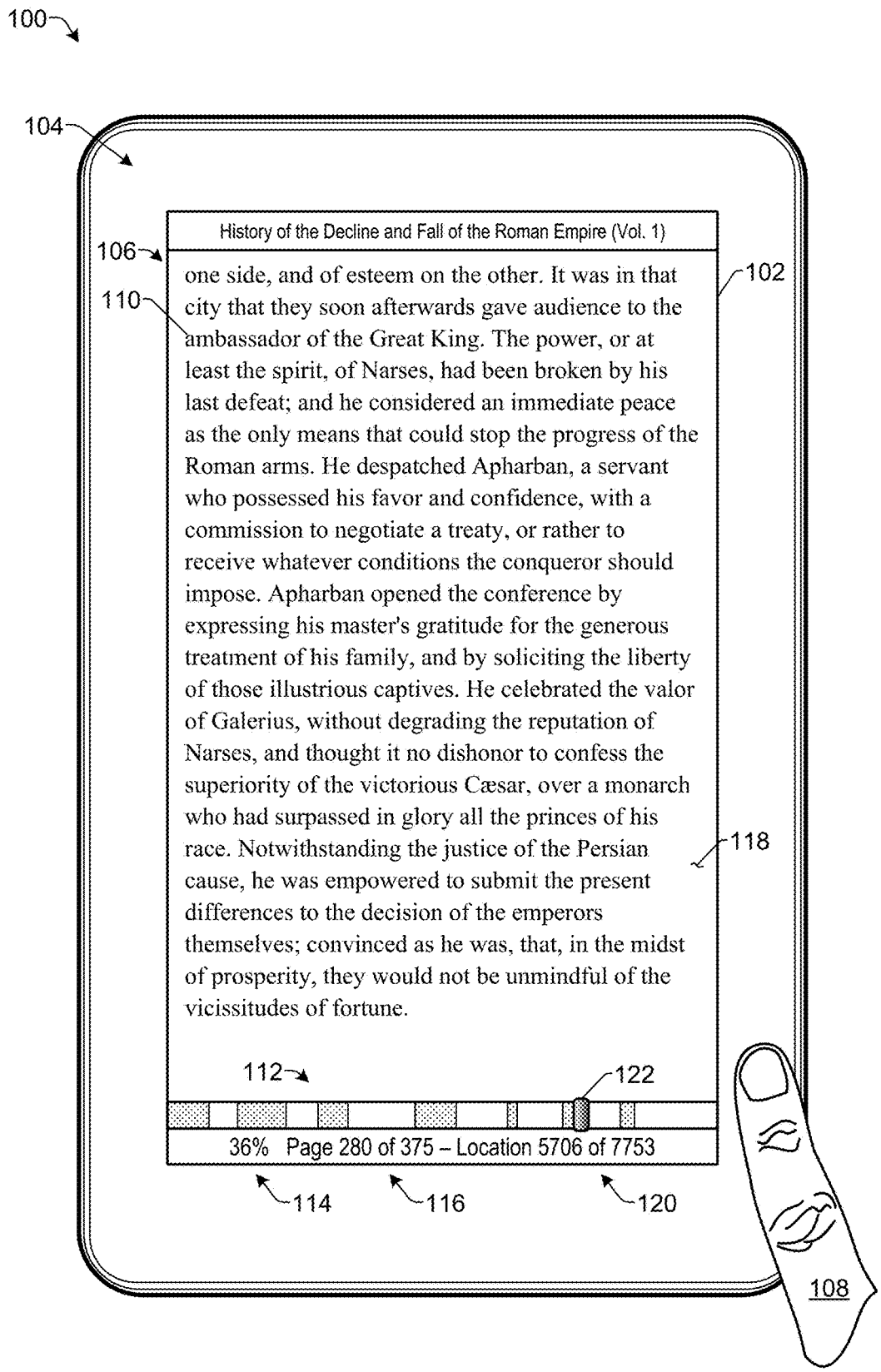
FIG. 1 illustrates an example consumption representation for a content item according to some implementations.

This disclosure includes techniques and arrangements for representing consumption of portions of content of a digital content item. For instance, an electronic device may present content of a content item on a display associated with the electronic device. Furthermore, the electronic device may present a visual representation of the progress of a user in viewing, accessing, or otherwise consuming the content of the content item. For example, a progress bar or other consumption representation may be displayed in connection with the content item to enable the user to discern which portions of the content item have been viewed or otherwise consumed by the user.

In some situations, a user may consume various portions of a content item out of order in a nonlinear or noncontiguous fashion. For instance, rather than starting at the beginning of the content and proceeding directly through the content in a contiguous and linear fashion, the user may prefer to skip to one or more portions of content in the middle of the content item. Thus, according to some implementations herein, a consumption representation may provide a visual indication to the user that these one or more portions of content have been accessed or otherwise consumed by the user. As one example, suppose that a user of an electronic device is reading an electronic book (eBook), such as a textbook, reference book, history book, or any other type of book. The user may elect to read only certain pages, chapters, sections, or the like, of the book, while skipping other portions of the book. The electronic device may keep track of which portions of the book the user has read and which portions the user has skipped over, and may provide a visual depiction of the portions skipped and the portions read in the consumption representation for the book.

Similar consumption representations may be created for other types of content in addition to electronic books, such as multimedia content, content items having embedded content, digital documents, webpages or online documents, and the like. In addition to the location of portions of content consumed, other types of information may also be conveyed with the consumption representation for a content item, such as portions of content accessed frequently, locations of embedded content, locations of annotations and highlighting, locations of material flagged by the author content provider, locations of trending or missing material, locations of chapter breaks or sections of the content, as well as locations of various terms of interest in the content such as character names, place names, topics, and so forth. Furthermore, a content provider may synchronize the consumption information of a user across multiple devices of a user to inform the user of the progress made with respect to a particular content item accessed on a plurality of the multiple devices. Additionally, the content provider may aggregate consumption information for a particular content item from multiple users to provide various types of information to the user or other users that may be interested in the particular content item.

For discussion purposes, some example implementations are described in the environment of providing consumption representations in connection with certain types of content items. However, the implementations herein are not limited to the particular examples provided, and may be extended to other types of content items and other types of consumption representation configurations, as will be apparent to those of skill in the art in light of the disclosure herein.

Example Interfaces

FIG. 1 illustrates an example electronic device 100 able to present a representation of consumption of content of a content item according to some implementations. The electronic device 100 may be implemented as any of a number of different types of electronic devices, as discussed further below. The electronic device 100 may include, or may have associated therewith, a display 102 to present an interface 104 for displaying a content item 106. In some types of electronic devices 100, the display 102 may be a touch-sensitive display configured with a sensor to sense a touch input received from an input effecter 108, such as a finger of a user, a stylus, or the like. Thus, the touch-sensitive display may receive one or more touch inputs, stylus inputs, selections of text, manipulations of displayed controls, and so forth.

In other implementations, the display 102 may be non-touch sensitive. Accordingly, in addition to, or as an alternative to, a touch sensitive display, the electronic device 100 may include various external controls and input devices. For example, some implementations (not shown in FIG. 1) of the electronic device 100 may include a virtual or physical keyboard, a mouse, a pointing stick, a touchpad, a trackball, a joystick, a remote control, buttons and/or various other controls for performing various desired inputs and interactions with the electronic device 100 and the content item 106 presented on the display 102. Additionally, in some implementations, one or more voice commands may be used to control or interact with the content items or interfaces herein. Further, in some examples, a user's eye position, gaze, or point of focus may be detected to serve as inputs or commands. Thus, implementations herein are not limited to any type of input devices, techniques, or controls.

In some cases, the content item 106 may be a book or electronic book (eBook) including text 110, such as one or more pages of text. For example, the display 102 may present the text 110 of an eBook and any images, illustrations, tables, maps, graphic elements, embedded video, embedded audio, multimedia, three-dimensional content, hyperlinked content, interactive content, such as Flash® content, video game content, 3D graphics content, or the like, that might be contained in the eBook. The terms "book" and/or "eBook," as used herein, may broadly include electronic or digital representations of printed works, as well as digital content that may include text, multimedia, hypertext, and/or hypermedia. Examples of content items 106 may include, but are not limited to, electronic books, magazines, newspapers, periodicals, journals, reference materials, textbooks, anthologies, instruction manuals, proceedings of meetings, forms, directories, web pages and online documents, emails, plays, screenplays, closed captioning transcripts of movies and television shows, song lyrics, personal documents, word processing documents, portable document format documents, business and office documents, and so forth, as well as other types of content items including text or multimedia that the user may view or interact with using the electronic device 100. Accordingly, a content item 106 may include any readable or viewable textual content that is in electronic or digital form, and additionally, or alternatively, multimedia content, such as video content, audio content, image content, and/or interactive content, such as Flash® content, video game content, 3D graphics content, and the like.

In the illustrated example of FIG. 1, suppose that a content item 106 that a user is currently consuming is an eBook entitled *History of the Decline and Fall of the Roman Empire, Volume* 1, by Edward Gibbon, and that the user has skipped around in the book to read various different portions that include subject matter of interest to the user. Thus, during presentation of content of the content item 106, the electronic device 100 may display a consumption representation 112 that represents or indicates which portions of the content item 106 have been accessed, viewed, read, played or otherwise consumed by the user. Additional information may further be displayed with the consumption representation 112, such as a percentage 114 of the content that has been consumed out of the total amount of content of the content item 106. Other information that may be displayed with the consumption representation 112 may include a current page number 116, of a page 118 of content currently displayed on the display 102, out of a total number of pages in the content item 106. Additionally, or alternatively, the information displayed may include a current location 120 of the content currently displayed out of the total number of locations in the content item 106.

Furthermore, in some examples, the consumption representation 112 may include a control or handle 122 that is positioned on the consumption representation 112 at a location that corresponds to a location in the content item of the currently displayed page 118. In the illustrated example, the currently displayed content is page 280 of 375 pages, e.g., about 75% of the way through the content item 106. Thus, the handle 122 is positioned at a location that is advanced approximately 75% along the total length of the consumption representation 112. The user may slide the handle 122 along the consumption representation 112 to access and display different portions of the content item 106. For example, if the user touches the handle 122 with a finger 108, and slides the handle 122 back to the middle of the consumption representation 112, the electronic device 100 may display a page of content that is halfway through the content item 106, e.g., page 188.

Figure 2:
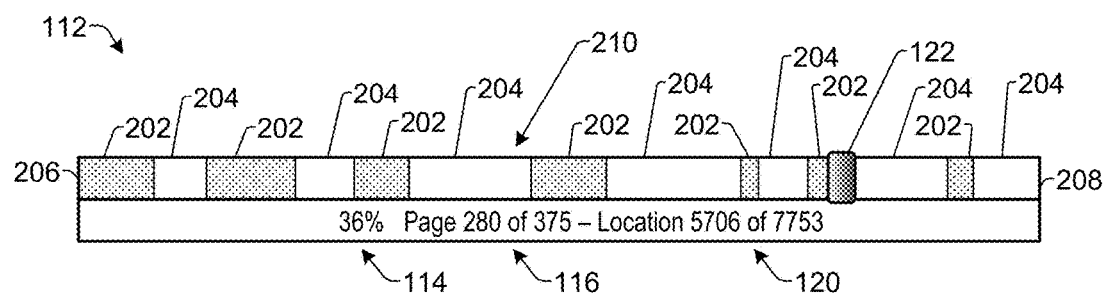
FIG. 2 illustrates an enlarged view of the example consumption representation of FIG. 1 according to some implementations.

FIG. 2 illustrates an enlarged view of the example consumption representation 112 of FIG. 1 according to some implementations. The consumption representation 112 may include at least one portion that is visually distinguished from another portion to indicate a location in the content item 106 of content that has been consumed by the user. In the illustrated example, the consumption representation 112 includes a first plurality of portions 202 that are visually distinguished from a second plurality of portions 204. For example, the first plurality of portions 202 may represent parts or locations in the content item 106 that have been consumed by the user, while the second plurality of portions 204 may represent parts or locations in the content item that have not yet been consumed by the user. The first portions 202 may be visually distinguished from the second portions 204 using any suitable graphics schemes or techniques, such as by using different colors, different shades, different backgrounds or fill patterns, cross-hatching, outlining, inserting or removing graphical elements, and so forth. Accordingly, implementations herein are not limited to any techniques for visually distinguishing one portion of the consumption representation from another.

The consumption representation 112 may include a graphic element that includes a first side 206 that may be representative of a beginning of an expanse or length of content of the content item 106, and a second side 208 that may be representative of an end of the expanse or length of content of the content item. Thus, the consumption representation 112 includes a bar or area 210 that is representative of a length of content of the content item. In some examples, the area 210 may be represented as a bar, a line, a strip, a stripe, a band, an elongated element, or other suitable graphic element. The area 210 is referred to, and illustrated as, a rectangular bar in some examples herein, but the area 210 of the representation is not limited to any particular shape or configuration.

In some examples, the area 210 may represent the total amount of content contained in a content item. In other examples, the length of content represented by the area 210 may be less than the total amount of content of the content item. For example, the consumption representation 112 may represent a chapter or other portion of content of the content item. Likewise, in other examples, the consumption representation 112 may represent more than the total amount of content of the content item, such as in the case where the consumption representation 112 represents a series of multiple books.

The one or more portions 202 that correspond to content that has been consumed by the user may be identified using various techniques for determining that the user has most likely read or otherwise consumed the particular portion of content. As one example, an amount of time that a user spends on a particular page or portion of the content may be used as a measure for determining whether the user has consumed the particular portion of content. In some examples, if the user spends more than a threshold amount of time having a particular page displayed, the electronic device may mark or classify that page as having been read or otherwise consumed.

Additionally, in some examples, the threshold amount of time may vary based on the amount of content contained on the particular page. For instance, if there is a large amount of text on a page, the time spent on the page may be compared with a first threshold determined based on the amount of text, whereas if there is a small amount of text, a simple image, or the like, a different, shorter, time threshold may be applied. Accordingly, the amount of time that a particular page or other portion of content is presented may be compared with a threshold time limit for determining whether the user has read or otherwise consumed the particular page or portion of content.

In addition, in some implementations, the threshold times may be adjusted based on a detected consumption rate of a particular user. For example, if data collected over time indicates that a particular reader's reading speed for one or more other books is substantially faster or slower than the reading pace of the average reader for those books, then the threshold times for determining that the particular user has read a particular page may be adjusted based on the estimated reading speed of the user.

As another example, gaze tracking may be used for determining whether a user has completed reading a page. For instance, the electronic device 100 may include one or more cameras or other sensors for tracking a gaze of a user to determine whether the user has read a particular page. Gaze tracking may determine when the user starts reading text at a beginning of the page, and may determine that the user has traversed the text on the page to the end of the page. Similarly, for video content, the gaze tracking may determine whether the user is actually looking at the video while the video content is being displayed.

In the case that the content item 106 is a book or similar textual or paginated content item, as a user consumes consecutive pages of the content item, the electronic device may keep track of each page consumed and establish a range of pages that have been consumed from a page at the beginning of the range to a page at the end of the range. For instance, a range may be created from a plurality of consecutive forward page turns. Additionally, one or more additional ranges may be created for backward page turns or following jumps from one portion of the content to another that skip at least one page. Pages that the user passes by too quickly to read, e.g., by not meeting a minimum time threshold based on the amount of content on the page, may not be classified or marked as having been read. However, a classifier or statistical model may take into consideration additional factors, such as a location of a currently presented portion of content or a furthest location at which content has been presented.

Furthermore, in the case of media content, such as audio and/or video content, as the user begins to consume a portion of content, a current range may be established that grows as the content is played. As one example, the range may be based on an elapsed play time at the start of the range to an remaining play time at the end of the range. When the user pauses playing a portion of content, or skips to another portion of content, the current range may be saved and marked or classified as consumed, and a new range may be started when the user starts to play another portion of the content. In addition, the consumption representation 112 may be updated in real time to show the current location of the user in the content item and the current consumption status of the content item.

As another example, for scrollable media such as electronic documents or webpages, a similar consumption representation may be provided with the consumption ranges arranged vertically along the scrollbar. For instance, the scrollbar handle may essentially function similarly to a digital paintbrush that adds a different color, shading or pattern to a background of the scrollbar or an adjacent consumption representation. A longer amount of time spent at a particular location in the scrollable media may result in more color, more shading, more patterning, or a darker color being added at that location in the consumption representation. Repeated visits to particular location in the scrollable media may also add more color, shading, patterning, or other graphic effects.

In addition, for hybrid or hyperlinked media, such as webpages having embedded content, eBooks or documents having embedded content, and the like, some implementations herein may generate a consumption representation to inform a user as to whether one or more portions of the media have already been viewed or otherwise consumed by the user. As one example, suppose that an eBook has a video embedded in a page of the book. Progress of the user in viewing the video may be added to the consumption representation of the eBook at a location corresponding to the location of the video display interface within the eBook. For instance, particular icons or other indicators may be provided in the overall consumption representation for the eBook that indicate a percentage of the user's progress in viewing the video.

As another example, an audio recording may be embedded in a webpage and consumption of the recording may be logged when the user accesses the audio recording. Subsequently, if the user visits another webpage that includes the same audio recording, the consumption representation may be displayed in association with the webpage to indicate that the user has already consumed the particular audio recording. For example, the consumption representation may be overlaid on a display of the webpage to indicate an entire amount of content of the webpage including multimedia content and any progress of the user in consuming any of the content of the webpage. Numerous other variations and examples are discussed additionally below and/or will become apparent to those of skill in the art having the benefit of the disclosure herein.

Figure 3:
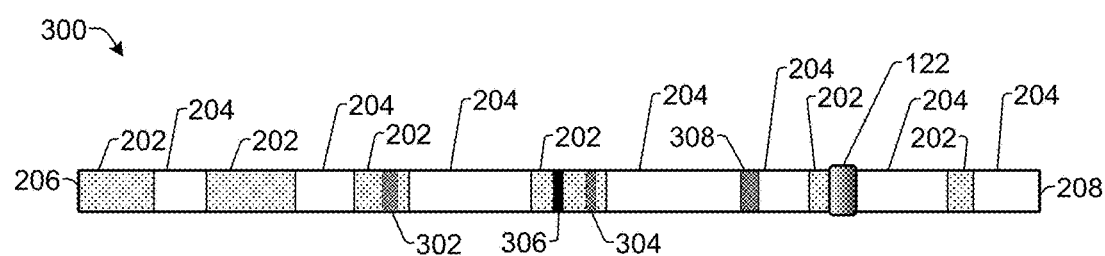
FIG. 3 illustrates an example consumption representation for a content item according to some implementations.

FIG. 3 illustrates an example consumption representation 300 for representing portions of a content item that have been consumed multiple times according to some implementations. In the example of FIG. 3, suppose that the user has gone back and reread several portions of the content item 106 that the user has already consumed at least once. Accordingly, the consumption representation 300 may indicate which portions of content have been accessed multiple times. As one example, the more times that a user accesses a particular portion of a content item, the consumption representation corresponding to that portion of content may be further visually distinguished. Accordingly, portions 302, 304, 306 and 308 of the consumption representation 300 may be darker or lighter, a different color, or a different pattern from the surrounding portions 202 of the consumption representation 300. For example, the portions 302, 304 and 308 may have been consumed twice or several times, and are thus darker than the surrounding portions 202, while the portion 306 may have been consumed (e.g., reread) many times, and is thus darker than the portions 302, 304, 308 and 202. In some examples, the amount of time that a user spends on a particular portion of content may result in a corresponding portion of the consumption representation being visually distinguished from other portions the user spent less time consuming. In other examples, however, multiple accesses to the particular portion of content may result in additional visual distinguishing.

As an alternative example, content representation 300 of FIG. 3 may represent content that has been downloaded but not consumed in some implementations. For example, portions 202 may represent parts of a content item 106 that have been downloaded to a device, and portions 204 may represent parts of the content item 106 that have not yet been downloaded. Accordingly, the portions 302, 304, 308 may represent portions of content that the user has consumed in the past, while portion 306 may represent a portion that has been most frequently consumed by a plurality of users, such as may be determined from consumption information aggregated for the content item from the plurality of users.

The electronic device may determine which portion of content to download next based on a number of considerations. For example, portion 306 has been viewed by the user in the past, but has not been currently downloaded. Thus, in the case that the content item is a work of fiction, portions that the user has already consumed may be given a low priority based on the assumption that the user will not re-consume those portions (at least right away). Rather, it may be preferable to download the portions that the user has not yet consumed.

On the other hand, in the case of a textbook, reference book, or the like, portions that the user has consumed may be more likely to be consumed again, and thus, the electronic device 100 may give higher priority to downloading those portions. Additionally, popularity determined for certain portions among a plurality of users may be applied when determining which portions to download first. For example, those portions that have been determined to have been consumed more frequently by a plurality of other users may be given higher priority to be downloaded before the less frequently consumed portions. Additional considerations for increased download priority may be given to parts that the user has highlighted, annotated, or consumed multiple times.

Figure 4:
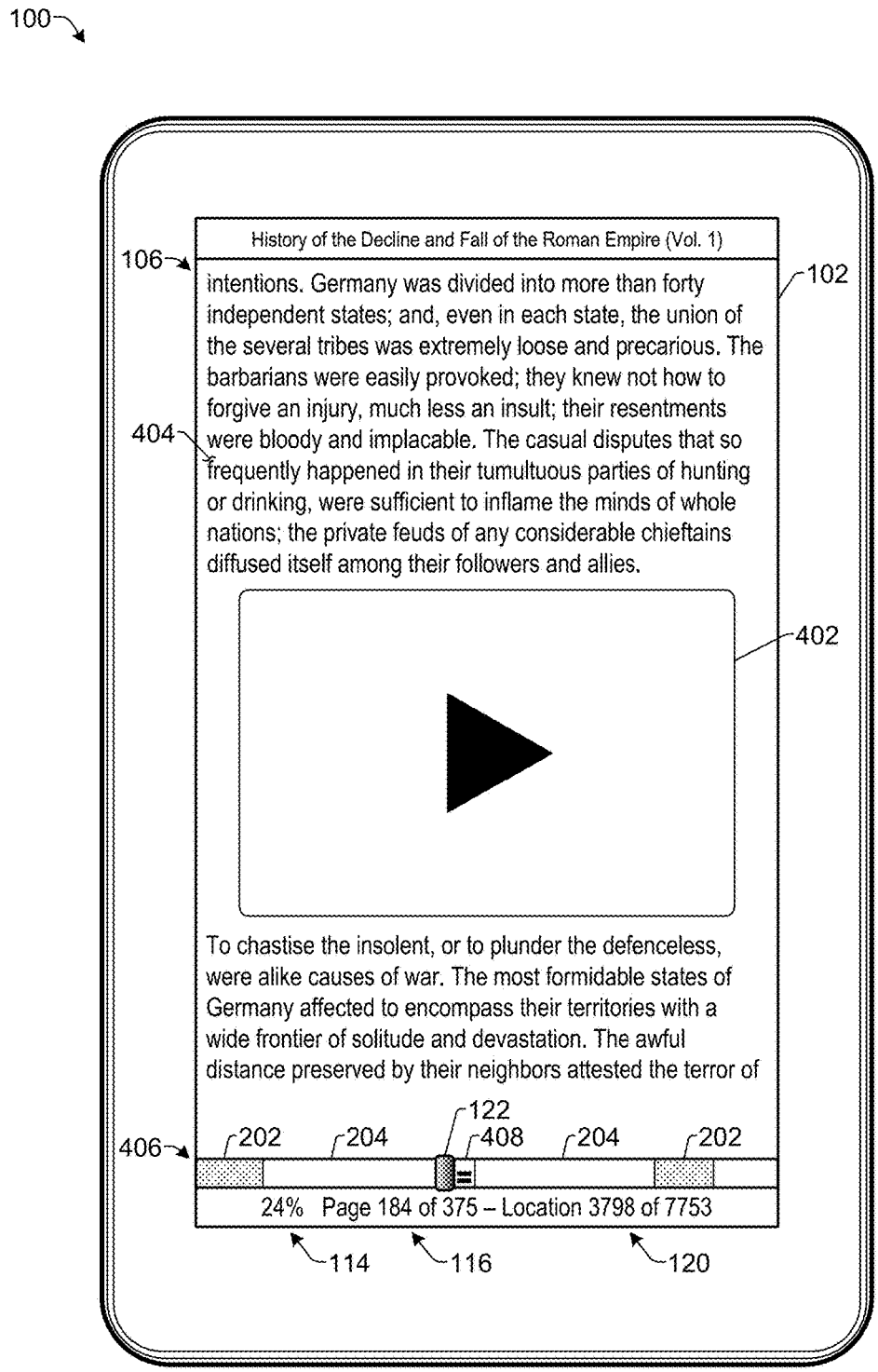
FIG. 4 illustrates an example content item having embedded or linked content according to some implementations.

FIG. 4 illustrates an example of a content item 106 having embedded multimedia content according to some implementations. In this example, the content item 106 includes an interface 402 to access embedded content, such as audio, video, multimedia content, linked, or hyperlinked content included in a displayed page 404 at a particular location of the content item. For instance, the user may tap or otherwise initiate playback of the embedded content in the interface 402 to view or play the embedded content directly within the content item 106. A consumption representation 406 for the content item 106 may include an icon, symbol, or other indicator 408 corresponding to the location of the embedded content interface 402 in the content of the content item 106. For example, if the embedded content is located on page 184 of 375, e.g., about halfway through the content of the content item 106, the indicator 408 may be displayed in the consumption representation 406 at about halfway through the consumption representation 406. Further, the other portions of the representation 400 may be resized to accommodate the indicator 408 so that they may still proportionally represent the locations of portions of content in the content item.

Figure 5A:
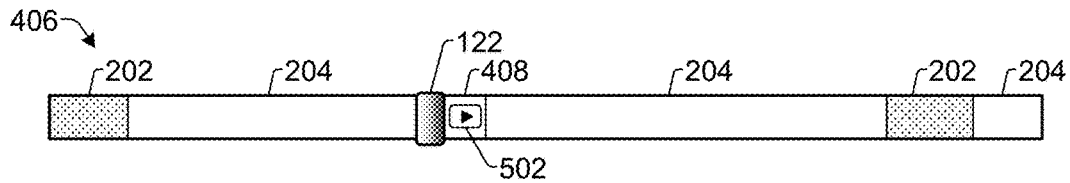
FIGS. 5A-5E illustrate example consumption representations for a content item with embedded or linked content according to some implementations.
Figure 5B:
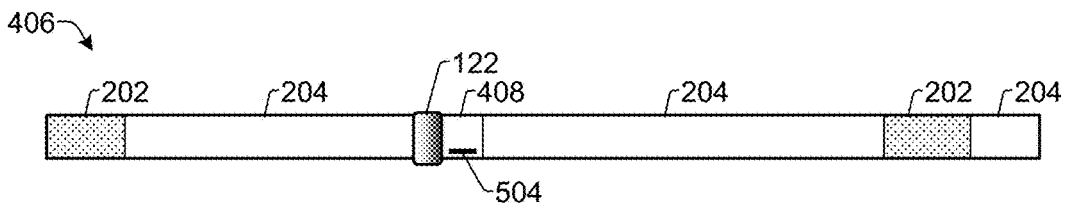
Figure 5C:
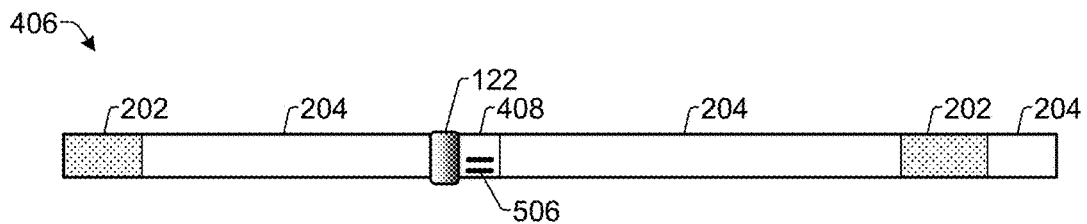
Figure 5D:
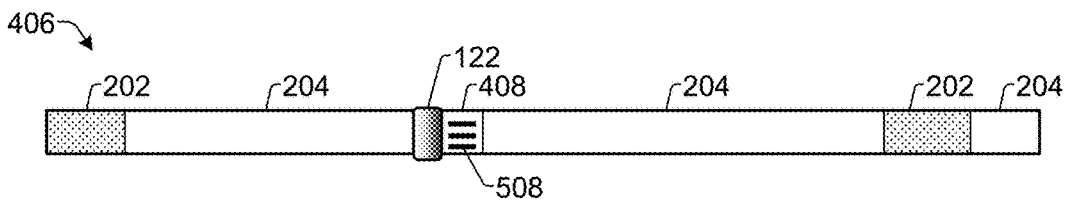
Figure 5E:
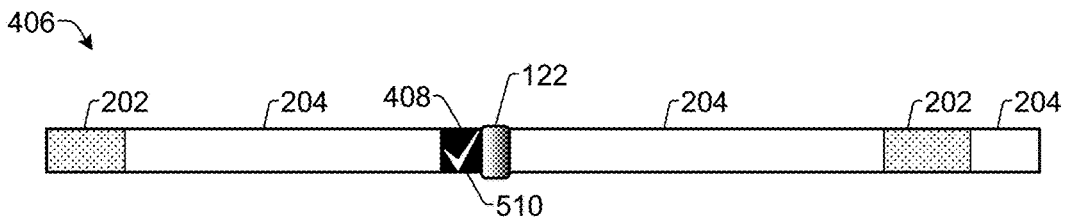

FIGS. 5A-5F illustrate examples of the consumption representation 406 during various stages of consumption of the embedded content in the interface 402 according to some implementations. FIG. 5A illustrates an example of how the consumption representation 406 may appear before the user begins to consume the embedded content in the interface 402. For instance, the indicator 408 may include an icon 502 indicating the presence of embedded content and may further indicate a type of embedded content, e.g., video or audio. Furthermore, the handle 122 may be located adjacent to the indicator 408 to indicate that the content currently being displayed is the embedded content at the interface 402. FIG. 5B illustrates an example icon 504 indicating that the user has consumed an initial portion of the embedded content in the interface 402. For example, a single bar or line may be displayed to show that consumption of a portion of the embedded content has taken place. FIG. 5C illustrates an icon 506 that includes a pair of bars or lines that may indicate that the user has consumed approximately one-half of the embedded content in the interface 402. Similarly, FIG. 5D illustrates an icon 508 having three bars or lines indicating that the user has consumed approximately three-quarters of the embedded content in the interface 402. Additionally, FIG. 5F illustrates an icon 510, such as a checkmark or the like that indicates that the embedded content has been viewed to completion. Additionally, or alternatively, the handle 122 may be moved to the right side of the indicator 408 to further indicate that the embedded content has been consumed by the user.

Figure 6:
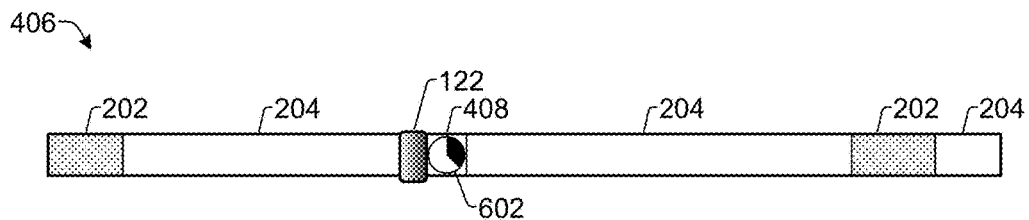
FIG. 6 illustrates an example consumption representation for embedded content according to some implementations.

FIG. 6 illustrates an alternative example icon 602 that may be used to indicate the amount of embedded content that has been consumed by the user according to some implementations. In the example of FIG. 6, a pie chart icon 602 may indicate the percentage of the embedded content that has been consumed by the user, or alternatively, an amount that is remaining to be consumed.

Figure 7:
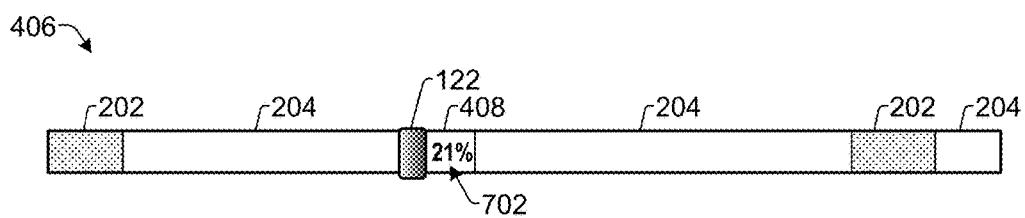
FIG. 7 illustrates an example consumption representation for embedded content according to some implementations.

FIG. 7 illustrates an alternative example icon 702 that may be used to indicate the amount embedded content that has been consumed by the user according to some implementations. In the example of FIG. 7, the icon 702 may include numeric indicator that indicates the numeric percentage of the embedded content that has been consumed by the user. Alternatively, the icon 702 may include a numeric indicator that indicates the percentage of embedded content remaining to be consumed by the user.

Figure 8:
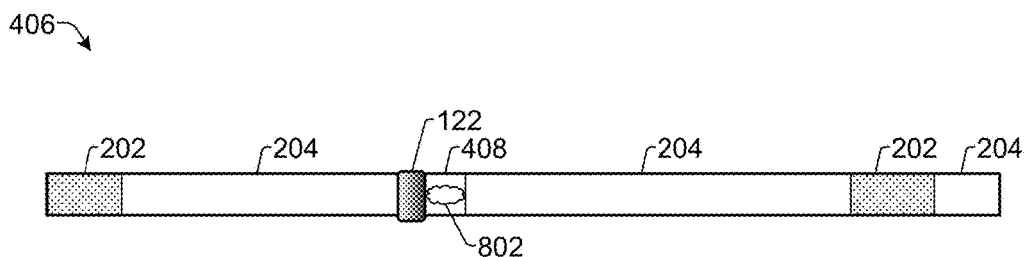
FIG. 8 illustrates an example consumption representation for embedded content available for download according to some implementations.

FIG. 8 illustrates an example icon 802 that may be used to indicate that the embedded content to be played in the interface 402 needs to be retrieved before the embedded content may be consumed. For example, a cloud icon 802, or other suitable icon or graphic, may indicate that the embedded content needs to be downloaded from a network accessible resource before the embedded content can be accessed. For instance, in some cases, the embedded content may be maintained on a network resource in the clouds such available from a server of a content provider, or the like. As one example, when the user selects the content to be played, the electronic device 100 may initiate download of the embedded content to be played in the interface 402 from the network resource. In some examples, the interface 402 may be a link to the content to be downloaded.

Figure 9:
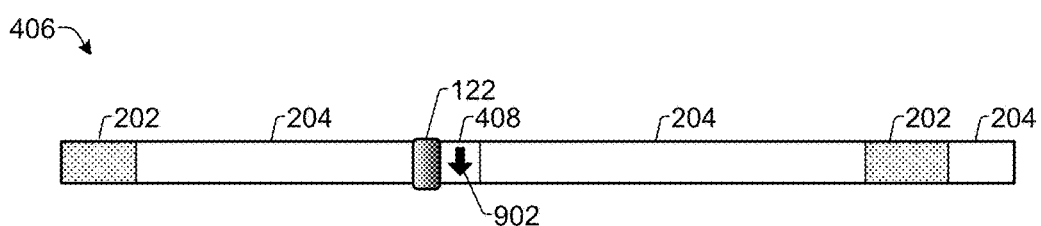
FIG. 9 illustrates an example consumption representation for embedded content during download according to some implementations.

FIG. 9 illustrates an example icon 902 that may be used to indicate that the embedded content is currently being downloaded from a network resource for presentation in the interface 402. For example, a down-arrow icon 902, or other suitable icon or graphic, may be displayed in the consumption representation 406 while the embedded content is currently being downloaded from the network resource.

Figure 10:
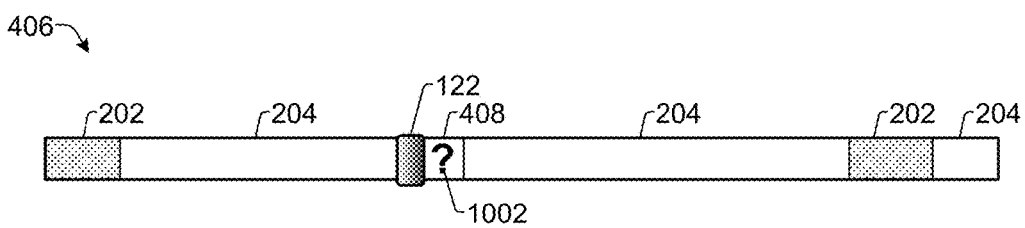
FIG. 10 illustrates an example consumption representation for embedded content that is missing or unavailable according to some implementations.

FIG. 10 illustrates an example icon 1002 that may be used indicate that the embedded content for the interface 402 cannot be located on a network resource. For example, a question mark icon 1002, or other suitable icon or graphic, may be displayed to indicate that the embedded content to be downloaded cannot be located on the network accessible resource.

Figure 11:
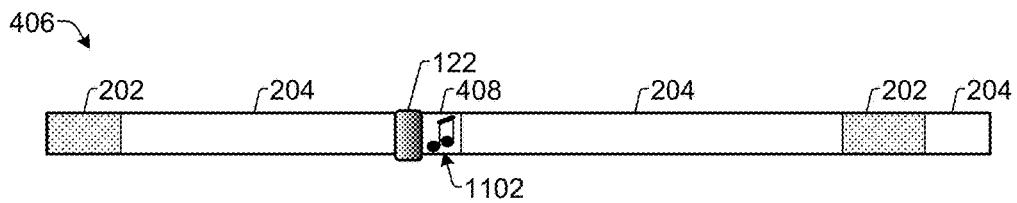
FIG. 11 illustrates an example consumption representation for audio embedded content according to some implementations.

FIG. 11 illustrates an example icon 1102 that may be used indicate that the embedded content associated with the interface 402 is audio or musical content according to some implementations. For example, a musical note icon 1102 or other suitable icon or graphic may be used to indicate that the embedded content is audio content, rather than video content.

Figure 12:
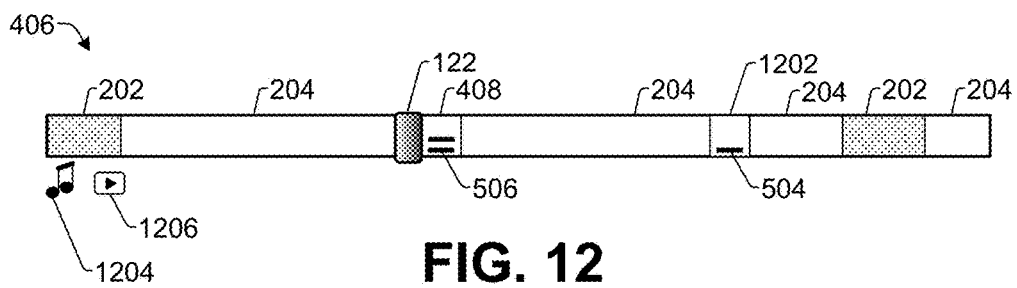
FIG. 12 illustrates an example consumption representation for embedded content according to some implementations.

FIG. 12 illustrates an example consumption representation 406 with embedded content in multiple locations according to some implementations. For example, the consumption representation 406 may include a second indicator 1202 of embedded content in addition to the first indicator 408. Furthermore, the consumption representation 406 may include icons 1204 and 1206 located outside of the consumption representation 406 that may indicate a type of the embedded content corresponding to each of the indicators 408, 1202 respectively. In the illustrated example, the progress icon 506 indicates that the user has consumed approximately half of the embedded audio content at 408 and less than half of the video content at 1202.

Figure 13:
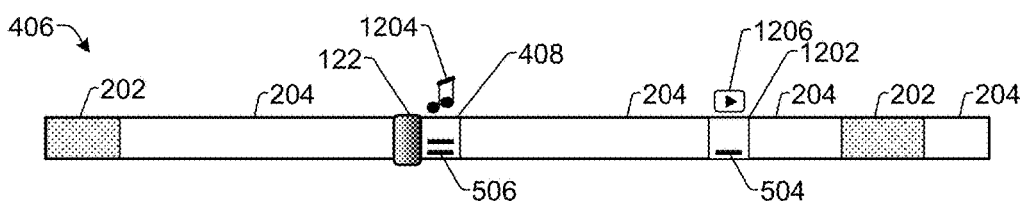
FIG. 13 illustrates an example consumption representation for embedded content according to some implementations.

FIG. 13 illustrates an alternative example of the consumption representation 406 of FIG. 12 with the icons 1204 and 1206 located adjacent to their respective indicators 408, 1202. For example, the icons 1204 and 1206 may be located above, below or overlaid on the indicators 408, 1202.

Figure 14:
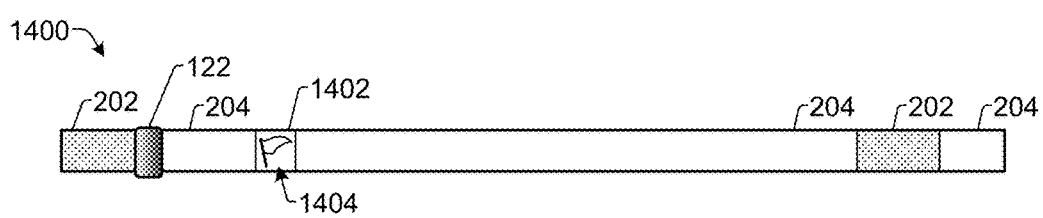
FIG. 14 illustrates consumption representation for a content item having flagged content according to some implementations.

FIG. 14 illustrates an example consumption representation 1400 that may include an indication of a location 1402 of a portion of content in the content item 106 that has been flagged. For example, a flag icon 1404, or other suitable icon or graphic, may be inserted into the consumption representation 1400 at the location 1402 to indicate that the corresponding portion of the content has been flagged. For instance, a flag may be applied in the case that the content item 106 is a work that is subject to peer review and a portion of the content has been found to be incorrect or invalid. As another example, the content may be flagged by an author of the content or by other authoritative source or entity to have a portion of the content replaced, updated, corrected, or the like.

Figure 15:
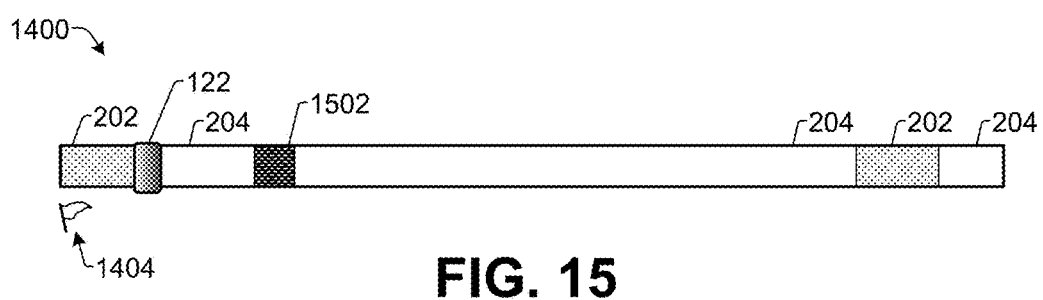
FIG. 15 illustrates an example consumption representation for a content item having flagged content according to some implementations.

FIG. 15 illustrates an alternative example of the consumption representation 1400 that may include indication 1502 of a location of a portion of content in the content item that has been flagged. In the example of FIG. 15, the flag icon 1404, or other suitable icon or graphic, may be located outside of the consumption representation 1400, such as on one end of the consumption representation 1400. The indicator 1502 of the portion of content that is flagged may be identified by being visually distinguished from a remainder of the area of the consumption representation 1400.

Figure 16:
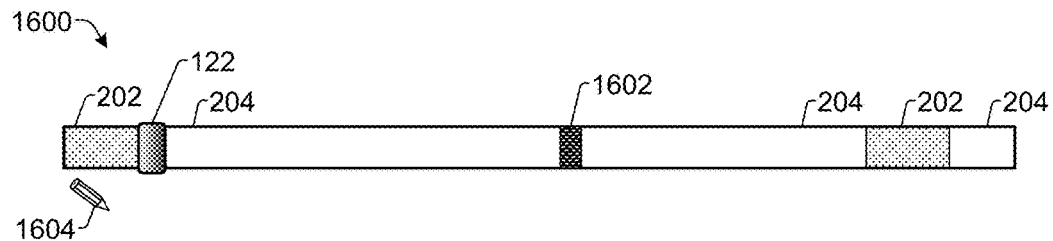
FIG. 16 illustrates an example consumption representation for a content item having annotated content according to some implementations.

FIG. 16 illustrates an example consumption representation 1600 that may include an indication that a portion of the content has been annotated according to some implementations. For example, the user of the electronic device 100 or one or more other users of other electronic devices 100 may annotate a portion of content of a content item 106, such as by adding a note or comment to the content item when displayed on the electronic device 100. The location of the annotated portion may then be visually distinguished as at 1602, and an icon 1604 indicating the presence of an annotation may be included within or outside of the consumption representation 1600.

Figure 17:
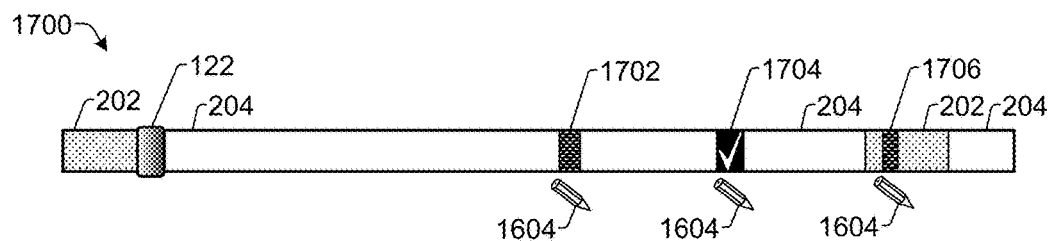
FIG. 17 illustrates an example consumption representation for a content item having multiple annotations according to some implementations.

FIG. 17 illustrates an example consumption representation 1700 that includes indications of multiple annotations to portions of content according to some implementations. In the example of FIG. 17, the annotation icon 1604 may be located adjacent to or overlaid on each portion of the consumption representation 1700 that corresponds to an annotated portion of the content of the content item. Accordingly, in this example, a first portion 1702 of the consumption representation 1700 may correspond to a first portion of content of the content item that has been annotated; a second portion 1704 of the consumption representation 1700 may correspond to embedded content in the content item that has been annotated, and a third portion 1706 of the representation 1700 may correspond to another portion of content of the content item that has been annotated.

Figure 18:
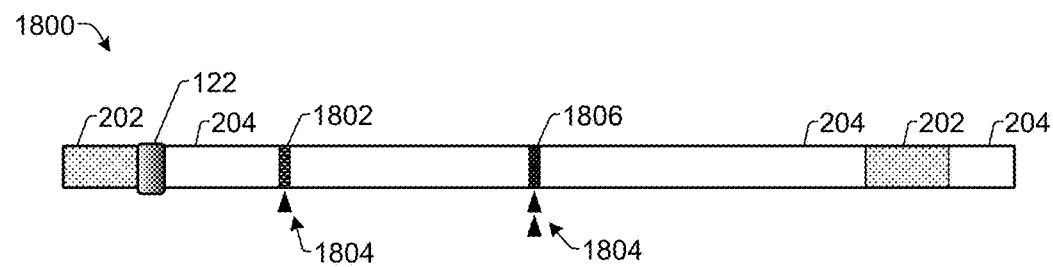
FIG. 18 illustrates an example consumption representation for a content item having trending content according to some implementations.

FIG. 18 illustrates an example consumption representation 1800 that includes an indication of a portion of the content that is currently trending or popular among other users. For example, a portion 1802 of the consumption representation 1800 may be visually distinguished and or may have an icon or arrow 1804 pointing to the portion 1802 to bring the user's attention to that portion 1802. For example, the electronic device 100 may receive information from the content provider or from other sources, such as social network sites (e.g., Facebook®), microblog sites (e.g., Twitter®), RSS feeds, or other external sources that indicate a portion of the content item that is currently trending or otherwise popular among a plurality of other users. The user may slide the handle 122 to the location of the portion 1802 to view or otherwise consume the corresponding content of the content item. Furthermore, another portion 1806 of content that is also trending may have a different, brighter, or darker color, or may have more arrows 1804 to indicate that the second portion is currently more popular than the first portion 1802.

Figure 19:
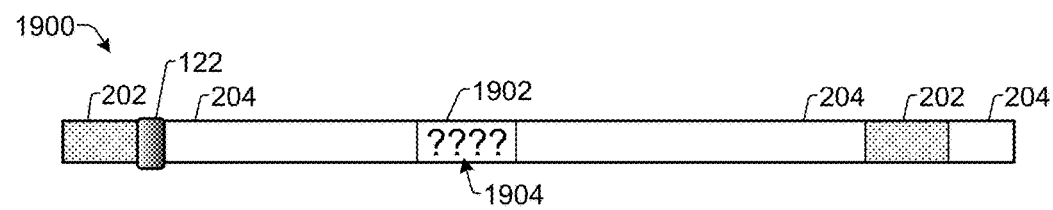
FIG. 19 illustrates an example consumption representation for a content item having missing or crowd-sourced content according to some implementations.

FIG. 19 illustrates an example consumption representation 1900 that includes an indication of a location 1902 of content that is unfinished or to be completed according to some implementations. For example, in the case of a beta-book, or community generated content, a portion of the content item may be left unfinished to be completed by members of a community, fans of a particular series of books, aspiring authors, or the like. Accordingly, an icon 1904, such as a series of question marks, or the like, may be included at the location 1902 corresponding to the portion of the content item to be completed.

Figure 20A:
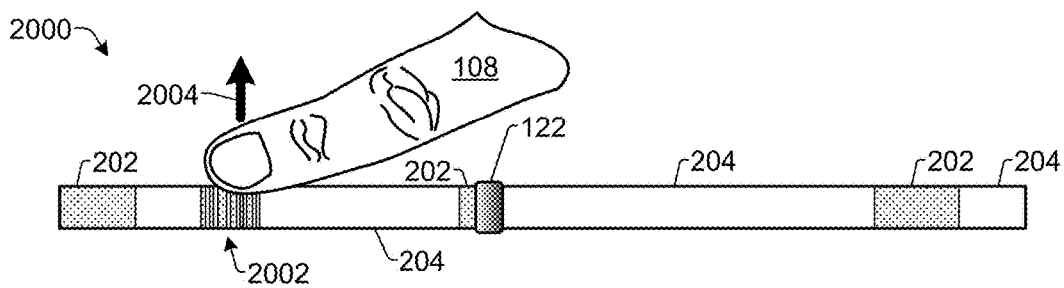
FIGS. 20A-20D illustrate an example of magnifying a portion of a consumption representation and accessing a portion according to some implementations.

FIGS. 20A-20D illustrate an example of magnifying a portion of a consumption representation 2000 to view details of the portion and accessing a portion according to some implementations. For example, as indicated at 2002, a user may have skipped some pages and read other pages of a content item that are very close together, which could make it difficult for the user to determine which portions of the content item have been consumed and which portions have not. Accordingly, various techniques may be used to magnify a portion of the consumption representation 2000. As one example, as indicated at FIG. 20A, the user may touch the portion to be magnified with a finger 108 and drag the finger in a y-axis direction, i.e., laterally away from the consumption representation 2000 in the direction of arrow 2004.

Figure 20B:
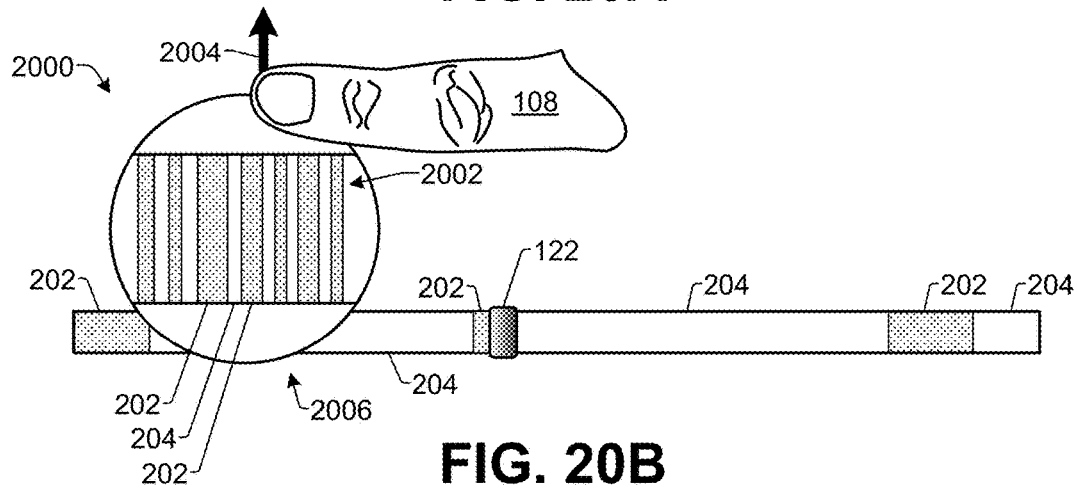

As indicated at FIG. 20B, a magnified segment 2006 may then be generated to show an enlarged view of the portion 2002 so that the user may better view the portions 202 that have been consumed and the portions 204 that have not yet been consumed. Furthermore, should the user move the finger 108 in the x-axis direction to traverse along the length of the representation 2000, the speed of traversal along the length of the representation 2000 may be slowed down in accordance with the amount of magnification. For example, in zoomed or magnified mode, a movement of the finger 108 by 100 pixels may only move the point of focus by half or less the corresponding distance in the x-axis direction, while in non-zoomed mode, the movement may be one-to-one. Numerous other techniques for magnifying a segment of the consumption representation 2000, and interacting with a magnified segment, will be apparent to those of skill in the art having the benefit of the disclosure herein.

Figure 20C:
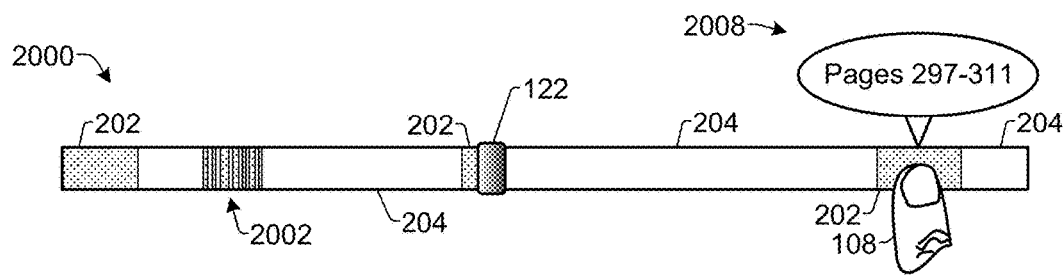

In addition, the user may touch, mouse-over, or otherwise select a visually distinguished portion 202 of the consumption representation 2000 to be presented with additional information. For, example, the user may select a visually distinguished portion 202 in the magnified segment 2006, or at any other visually distinguished portion 202 of the consumption representation 2000. As illustrated in FIG. 20C, when the user touches, clicks-on, mouses-over, or otherwise selects a visually distinguished portion, the electronic device may display information 2008 related to the selected portion 202, such as a range of pages of content that the visually distinguished portion 202 represents, a chapter identifier, a range of playback time, a range of frames, or the like, depending on the type of content item to which the portion pertains. Thus, implementations herein provide a functionality to enable a user to quickly determine particular portions of content that have already been consumed.

Figure 20D:
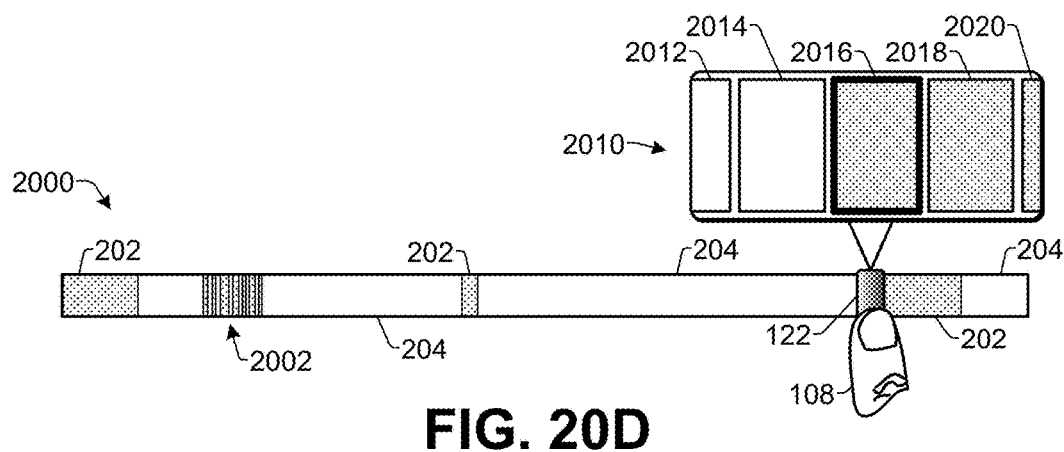

FIG. 20D illustrates an example of the consumption representation 2000 in which thumbnail images of the pages of the content item may scroll within a window 2010 according to some implementations. For example, as the user moves the handle 122 along the representation 2000, the window 2010 may be displayed adjacent to the representation 2000. The window 2010 may include thumbnail images of pages that correspond to the location of the handle 122. The thumbnail images may further include an indication as to whether the corresponding page of the content item has been consumed, such as by being visually distinguished from thumbnail images that correspond to pages that have not been consumed.

In the example of FIG. 20D, the thumbnail images 2012 and 2014 represent pages that have not yet been consumed, while thumbnail images 2016, 2018 and 2020 may represent pages that have been consumed, corresponding to a location of a portion 202 in the consumption representation 2000. Furthermore, thumbnail image 2016 may be highlighted or otherwise visually distinguished from the other visible thumbnail images 2012, 2014, 2018 and 2020, to indicate that this is the page that is or will be displayed on the display when the user stops moving the handle 122. Thus, in some examples, the content item 106 may be paginated, and thumbnail images of the pages scroll through the window 2010 as the user scrubs the handle 122 along the representation 2000.

Figure 21:
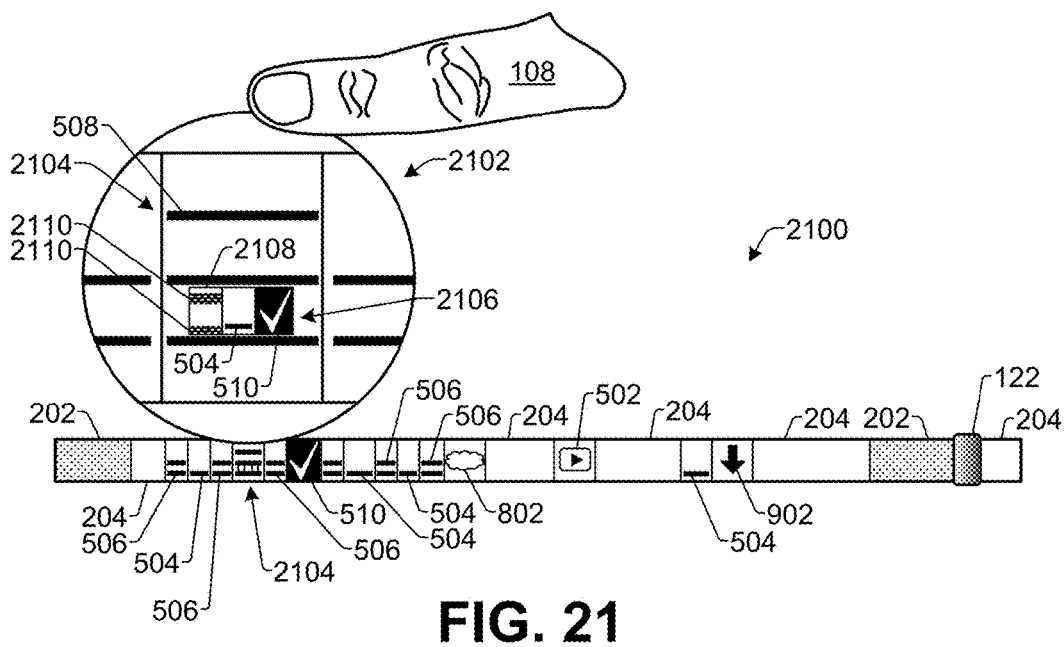
FIG. 21 illustrates an example consumption representation having multiple types or instances of embedded content according to some implementations.

FIG. 21 illustrates an example consumption representation 2100 that includes a plurality of instances of embedded content in addition to textual content. Furthermore, in this example, the user has consumed various portions of some of the embedded content, as indicated e.g., at 504, 506, and 508. The user has also completed consumption of one portion of embedded content, as indicated at 510, and is currently downloading another portion of embedded content as indicated at 902.

Additionally, in some examples, the embedded content may itself include embedded content, and this may be indicated in the consumption representation 2100. For example, the user may be able to enlarge or magnify a portion of the representation 2100, as discussed above to view a magnified segment 2102. In this example, the magnified segment 2102 includes an indicator of embedded content 2104, which may be thus far consumed three quarters of the way, as indicated by the three bars 508. The indicator 2104 may further include one or more indicators of embedded content 2106 within the indicator 2104. In the illustrated example, there are three indicators 2106 of embedded content within the embedded content. A first indicator 2108 in this example is a smaller version of a consumption representation able to indicate locations 2110 of content, which has been consumed in a noncontiguous or nonlinear manner. A second indicator indicates that a second content item has been consumed about one-quarter of the way, as indicated by the single bar 504. A third indicator indicates that the third embedded content has been fully consumed, as indicated by the indicator 510.

Numerous other variations will be apparent to those of skill in the art having the benefit of the disclosure herein. For example, the embedded content corresponding to indicators 2106 that is embedded in the embedded content corresponding to indicator 2104 may itself include one or more embedded content items, which may be indicated by further magnification of the indicators, and so forth. Additionally, in the case that the display is capable of three-dimensional display, the indicators of embedded content may extend beyond two dimensions. Further, in some examples, the embedded content may be consumed in a nonlinear manner, and the locations that have been consumed may be displayed visually distinguished in a vertical or horizontal manner, similar to the consumption representation 112 and various other examples discussed herein.

Figure 22:
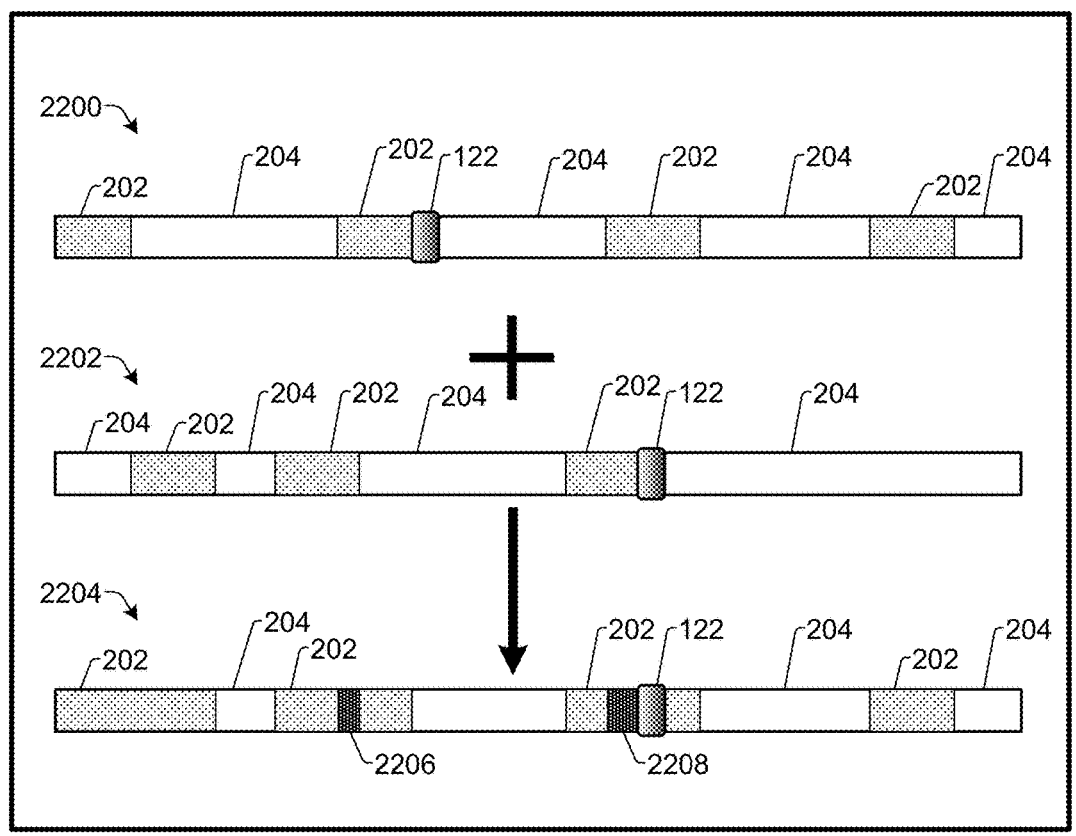
FIG. 22 illustrates an example of synchronizing consumption representations from multiple instances of a content item according to some implementations.

FIG. 22 illustrates an example of synchronizing or merging consumption representations across multiple devices of a user. For example, suppose that the user has a first device that includes a first instance of a particular content item, and a second device that includes a second instance of the particular content item. Further, suppose that the user accesses various portions of the particular content item on the first device resulting in a first consumption representation 2200. The user may subsequently access the second instance of the particular content item on the second device without first synchronizing the consumption representation 2200 from the first device. For example, the user may be out of contact with a network or may otherwise not receive consumption information to synchronize the consumption from first device with the second device. Accordingly, the user may access various portions of the particular content item on the second device, resulting in the consumption representation 2202.

Subsequently, the consumption representation 2200 from the first device may be synchronized or merged with the consumption representation 2202 from the second device, either on the first device, or on the second device, or both, resulting in the consumption representation 2204. For example, the handle 122 may be positioned in a location on the consumption representation 2204 corresponding to the content that the user most recently accessed in the content item. Furthermore, in some examples, overlapping portions of the content from consumption representations 2200 and 2202 that the user consumed twice may be visually distinguished, as indicated at 2206 and 2208, such as by being darker, brighter, a different color, and so forth.

In some examples, the consumption representations may be synchronized by sending, to a content provider, location information, logs, or other records of portions of the content item that have been consumed. The content provider may then synchronize this information with other devices associated with the user, such a through a common user account. As another example, a bit map representation of a consumption representation may be sent to the content provider, rather than log information or location information. Additionally, in some examples, as discussed below, consumption information obtained from a plurality of users may be aggregated in a similar manner to the merging described in FIG. 22 to determine portions of the content that are popularly consumed by users who have accessed a particular content item.

Figure 23:
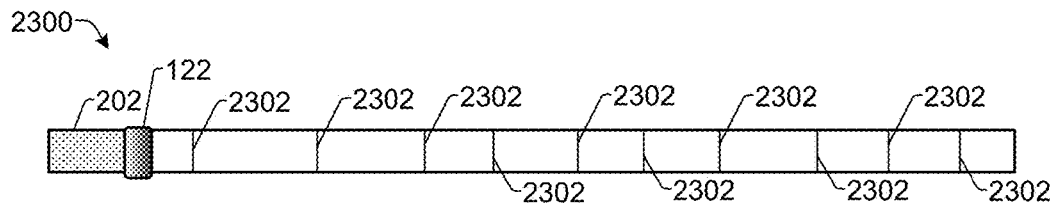
FIG. 23 illustrates an example consumption representation having sections or chapters of the content item identified according to some implementations.

FIG. 23 illustrates an example consumption representation 2300 that includes indicators 2302 of locations of chapter breaks, section divisions, or the like, in a content item. For example, the consumption representation 2300 may include a plurality of lines, rectangles, or other visual indicators 2302 that are located in the consumption representation 2300 in a location corresponding to a location in the content item of the chapter breaks or the like. In the illustrated example of FIG. 23, the chapter breaks are illustrated as being overlaid on the consumption representation 2300; however, in other examples, the chapter breaks may be displayed above or below the consumption representation 2300 such as by placing ticks, dots, arrows, or other graphics at the corresponding locations of the indicators 2302. Further, other divisions established in the content item may be represented in addition to or instead of chapter breaks, such as subsections, divisions or ranges established by peer groups, instructors, teachers, group leaders, and so forth.

Figure 24:
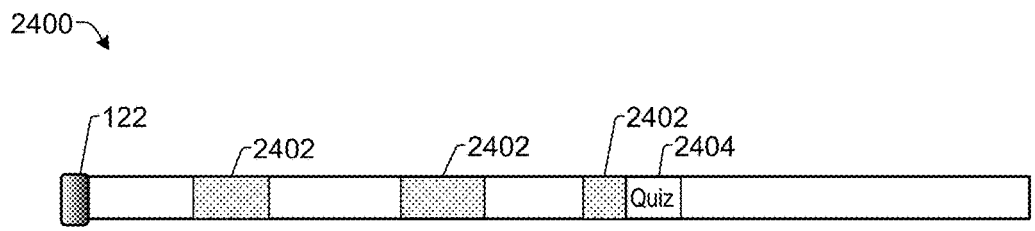
FIG. 24 illustrates consumption representation for advancing through a content item according to some implementations.

FIG. 24 illustrates an example consumption representation 2400 that may be provided by a first user to a second user, such as for completing a reading assignment, studying for a part in a play, participating in a book club, or the like. For example, suppose that a teacher assigns reading in a content item to the students in the teacher's class and provides the consumption representation 2400 to the content provider, which may synchronize the consumption representation 2400 with the electronic devices 100 of the students. The consumption representation 2400 may be displayed to the students when they access the content item 106. The electronic device 100 may track the progress of the students through the assigned portions 2402 of the content item. As a student completes the reading assignment, the portions 2402 of the consumption representations may change appearance or the like. In addition, in some cases when the student has completed all of the assigned portions of the content corresponding to the consumption representations 2402, a quiz, test, homework problems, or the like, as indicated at 2404 may be displayed to the student on the electronic device. Alternatively, the student may receive a message displayed on the device indicating that the student has completed the assignment and/or the teacher may also receive a message to that effect. As another example, the teacher may receive a consumption representation for each student, and the representation may indicate which portions were consumed by each student. The consumption representation may further indicate how much time each student spent consuming each portion, whether portions were consumed more than once, and so forth, as discussed above with respect to the example of FIG. 3. The consumption representations of multiple students may be aggregated and combined into a single consumption representation, such as to show which parts were consumed most frequently. Similar representations may be created for other groups of users, such as book clubs, conference attendees, and the like. As another example, an author may request feedback on new chapters of a content item and a feedback form may be presented to the user after the user has finished reading one or more of the chapters indicated by the consumption representation 2400.

Figure 25:
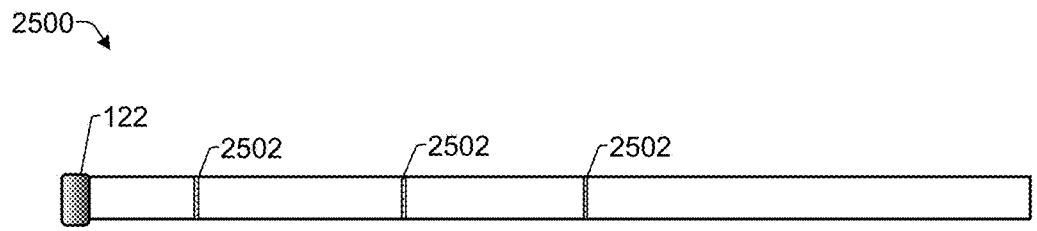
FIG. 25 illustrates an example consumption representation for a content item having one or more highlighted portions according to some implementations.

FIG. 25 illustrates an example consumption representation 2500 that may be provided to a user to indicate portions 2502 of the content item that have been highlighted according to some implementations. For example, in some cases a content item may include one or more portions that have been highlighted by other users who have consumed the content item. For example, there may be certain parts of the content item that users tend a highlight frequently, which may be referred to as popular highlights. Accordingly, when a particular user acquires the content item, the information related to popular highlights may be provided to the user along with the content item, and may be displayed on the consumption representation 2500 when the user accesses the content item. As another example, the user may add highlights to the content item as the user consumes a content item. Such highlights of the user may also be displayed on the consumption representation in place of, or in addition to, the popular highlights. Bookmarks entered by a user may be displayed on the consumption representation 2500 in a similar manner.

Alternatively, FIG. 25 may be a view provided to a user in response to a search query submitted by the user within the content item. For example, the user may activate a control to cause display of a search window to receive entry of a query, such as to receive entry of one or more keywords. In response to the query, the electronic device may display the consumption representation 2500 with the locations 2502 overlaid on the consumption representation to indicate the location of the one or more keywords entered into the search window. The user may slide the handle 122 along the consumption representation 2500 to advance to the location of the search results at the indicated locations 2502.

Figure 26:
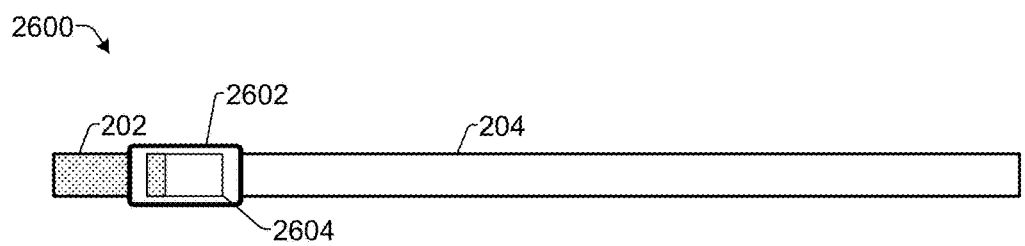
FIG. 26 illustrates an example consumption representation having a variable sized marker according to some implementations.

FIG. 26 illustrates an example of a consumption representation 2600 that includes a variable size handle 2602 according to some implementations. For example, in the case that the content item is not very long, the handle 2602 may be enlarged in a manner similar to a scrollbar handle to indicate an amount of content to be consumed in the content item corresponding to the consumption representation 2600.

Additionally, or alternatively, the handle 2602 may be at least partially transparent or translucent in some cases so that the representation under the handle may be viewed when the handle is being moved. For example, the handle 2602 may include a transparent portion 2604, such as a transparent window. The transparent portion 2604 may be transparent while the handle 2602 is being dragged to show the representation 2602 behind the handle 2602, and may be solid or opaque while the handle 2602 is stationary. Thus, a color change or other visual distinguishing of a portion of the representation 2600 that has been consumed may not be visible when the handle 2602 is not moving. For example, it may be distracting to the user if the representation 2600 is changed or updated as the user consumes each portion of content, particularly in smaller content items in which the representation may update substantially in a short amount of time. Thus, by having a large handle 2602, or by making updates underneath the handle obscured by the handle 2602, such distractions may be avoided.

Figure 27:
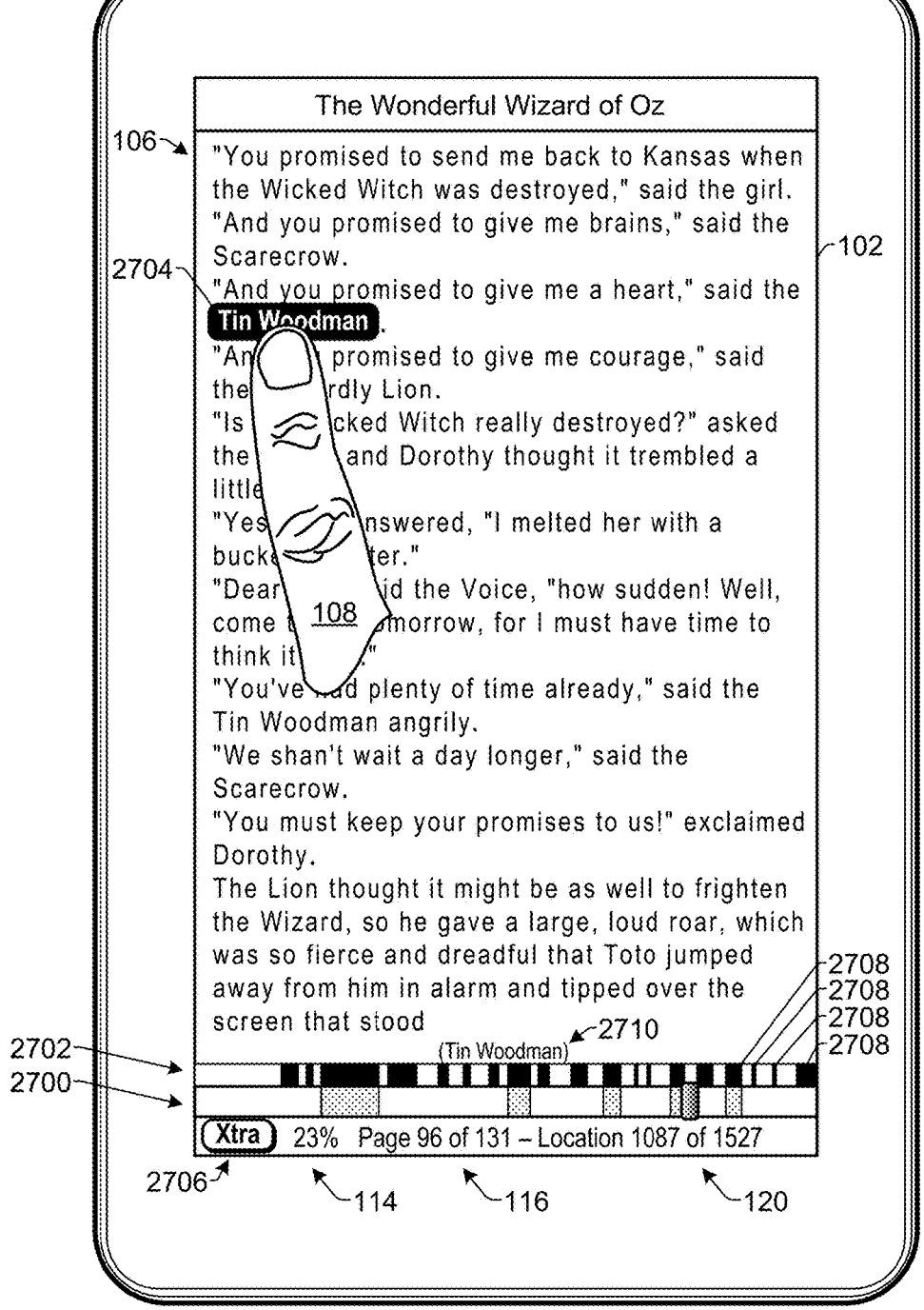
FIG. 27 illustrates an example consumption representation for a content item including the supplemental information related to the content item according to some implementations.

FIG. 27 illustrates an example consumption representation 2700 in which a supplemental information visual representation 2702 related to the content of the content item is overlaid on or located adjacent to the consumption representation 2700 according to some implementations. In this example, suppose that the content item 106 that the user is reading is *The Wonderful Wizard of Oz* by L. Frank Baum, and that the user has selected the name of a character from the displayed content of the content item, e.g., the "Tin Woodman," as indicated at 2704. In some examples, the supplemental information representation 2702 corresponding to the Tin Woodman may be automatically displayed with the consumption representation 2700. In other examples, the user may select a control, such as a button 2706 to view the supplemental information representation 2702 or to access an interface. As an example, the supplemental information representation 2702 may indicate the location in the content item of each occurrence of the character name "Tin Woodman," as indicated at 2708. Furthermore, a label 2710 may be included to identify the particular term from the content item to which the supplemental information representation 2702 corresponds.

In some examples, a plurality of supplemental information visual representations 2702 may be displayed, such as in a stacked or overlaid configuration, aligned with the consumption representation 2700. For instance, each visual representation 2702 may represent a different character, topic, place, or other term or object contained in the content item. Thus, the representations for the Tin Woodman, Dorothy, the Scarecrow, the Cowardly Lion, etc., could all be displayed contemporaneously or simultaneously with the consumption representation 2700 and visually distinguished from one another. For example, the user may be provided with an option to select a color or graphics scheme for each visual representation 2702, while in other examples, the content provider or publisher may specify respective graphics schemes for the visual representations.

Figure 28:
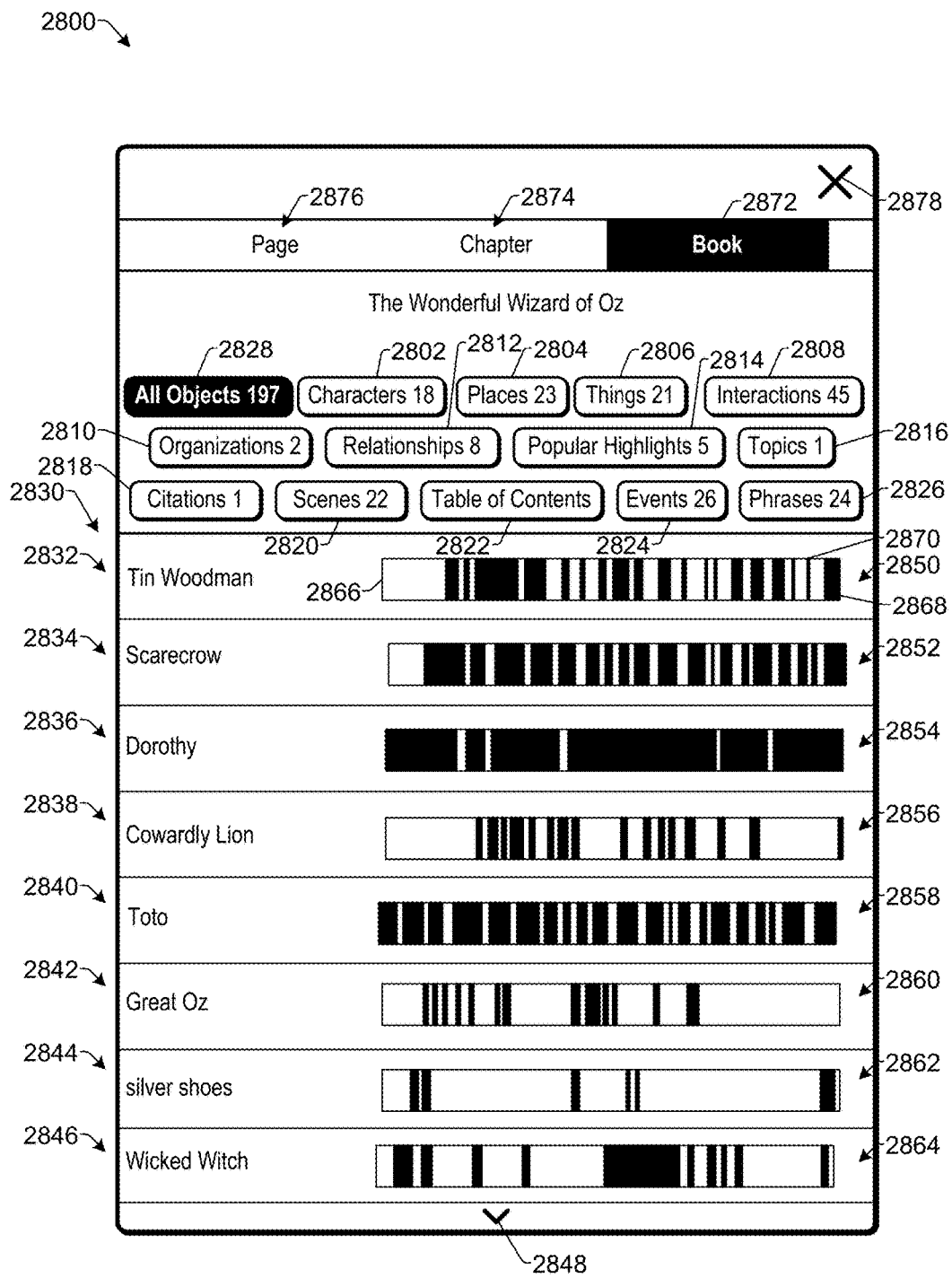
FIG. 28 illustrates an example interface for selecting supplemental information related to a content item for display with a consumption representation according to some implementations.

FIG. 28 illustrates an example user interface 2800 that the user may use to select one or more terms or aspects, referred to as objects, to display in a supplemental information representation 2702, as discussed above. For example, the user may select the button 2706 displayed in the interface of FIG. 27, or may use any other suitable control, to access the interface 2800 to select one or more of the terms presented therein, such as characters, places, and so forth. The interface 2800 may include selectable buttons to filter the displayed objects according to type, such as for characters 2802, places 2804, things 2806, interactions between characters 2808, organizations or groups 2810, relationships between characters 2812, popular highlights 2814, topics 2816, citations 2818, scenes 2820, table of contents 2822, events 2824, and phrases 2826 contained in the content item that are believed to be of interest, as well as a button 2828 that may be selected to display all of the types of objects in a list 2830.

In the illustrated example, the user interface 2800 displays the objects identified in *The Wonderful Wizard of Oz*. Accordingly, in this example, the user interface 2800 displays a listing 2832 for the Tin Woodman, a listing 2834 for the Scarecrow, a listing 2836 for Dorothy, a listing 2838 for the Cowardly Lion, a listing 2840 for Toto, a listing 2842 for the Great Oz, a listing 2844 for silver shoes, and a listing 2846 for the Wicked Witch. Additional objects listed may be viewed by scrolling down using an arrow 2848. Associated with each object listing 2832-2846 is a visual representation that provides an indication of a location and frequency of each object in the content item. Thus, the interface 2800 provides a visual representation 2850, for the Tin Woodman, a visual representation 2852 for the Scarecrow, a visual representation 2854 for Dorothy, a visual representation 2856 for the Cowardly Lion, a visual representation 2858 for Toto, a visual representation 2860 for the Great Oz, a visual representation 2862 for silver shoes, and a visual representation 2864 for the Wicked Witch. These visual representations may be visually distinguished from one another, as discussed above, such as with different color or graphics schemes. The user may use any of various suitable techniques to select one or more of the objects listed in the interface to have the corresponding visual representation displayed adjacent to the consumption representation 2700 of FIG. 27. Further, in some examples, the consumption representation 2700 may be extended vertically to overlie the visual representations so that a user may more easily match up locations that have been consumed or to be consumed with the locations of occurrences of various objects in the content item.

The visual representations 2850-2864 may represent both the location and frequency of occurrence of each corresponding object in the content item. For example, with respect to the visual representation 2850 for the Tin Woodman, the visual representation 2850 includes an area extending between a first side 2866 that is representative of a beginning of the content item, and a second side 2868 that is representative of an end of the content item. At least one vertical line, bar or other type of marking 2870 may be located in the visual representation 2850. The marking 2870 may correspond to at least one occurrence of the object in the content item. Further, in some implementations, the location of the marking 2870 may generally correspond to a location of the occurrence of the object in the content item itself, such as a location of a portion of text that includes the term. In the illustrated example, with respect to the visual representation 2850 for the object Tin Woodman, a plurality of markings 2870 are located within the visual representation 2850 corresponding to a plurality of occurrences of the character "Tin Woodman," or variations thereof, in the text of the content item. For example, a leftmost first marking, closest to the first side 2866, represents the first occurrence of the character Tin Woodman in the content item. A rightmost last marking, at the second side 2868, represents the location of the final occurrence of the Tin Woodman in the content item. The other markings 2870 located between the first marking and the last marking may represent other occurrences of the Tin Woodman in the content item at various locations corresponding to the actual occurrences of the term "Tin Woodman," or alternate names thereof, in the content item. In some examples, the location of the occurrence of each term is included with a list of the terms identified in the content item 106, such as may be provided by a content provider or other source, as discussed below. In other examples, the electronic device 100 may search the content item 106 to determine a location of a selected term (and any alternate names identified for the term) within the content item, and may generate one or more of the visual representations based on the results of the search.

The user may further filter the objects displayed in the list 2830 by selecting between a book view 2872, a chapter view 2874, and a page view 2876. For example, the book view 2872, as shown in FIG. 28, enables display of all of the objects identified in the content item; the chapter view 2874 may limit the objects shown in the interface 2800 to those contained in a particular chapter from which the interface 2800 is accessed; and the page view 2876 may limit the objects shown to those contained on a particular page from which the interface 2800 was accessed. When the user has selected one or more objects from the interface 2800, the user may close the interface 2800, such as by selecting an "X" 2878, and the selected visual representation(s) will be displayed adjacent to or overlaid in the consumption representation, as discussed above with respect to FIG. 27. Additional information on the interface 2800, and generating the supplemental information to support the interface 2800, is provided in U.S. patent application Ser. No. 13/246, 759, filed Sep. 27, 2011, which is incorporated by reference herein in its entirety.

Figure 29:
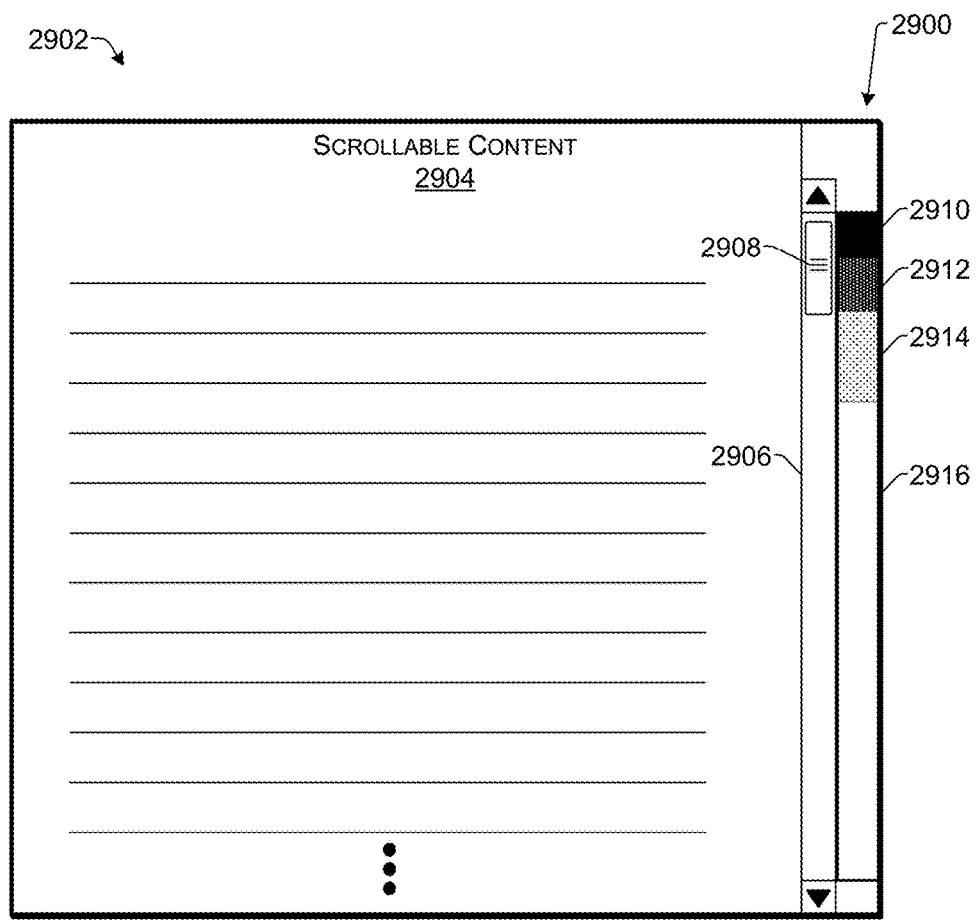
FIG. 29 illustrates an example consumption representation for a scrollable content item according to some implementations.

FIG. 29 illustrates an example consumption representation 2900 that may be employed in connection with scrollable content according to some implementations. For example, a user interface 2002 may include scrollable content 104 along with a scrollbar 2906. The scrollbar 2906 may include a scroll handle 2908 that may be moved in an up-and-down manner to scroll the content 2004 in a direction opposite to the movement of the scroll handle 2906. In this example, the consumption representation 2900 is displayed adjacent to the scrollbar 2906 for clarity of illustration, but in other examples, the consumption representation 2900 may be overlaid on the scrollbar 2906. As mentioned above, in some limitations, the scroll handle 2908 may act in a manner similar to a paintbrush such that as the scroll handle moves within the scrollbar 2006, portions 2910, 2912 and 2914 of the consumption representation corresponding to the location of the scroll handle 2908 may be visually distinguished from other portions 2916 of the consumption representation 2900. For example, as the scroll handle spends more time in a particular location, that portion of the visual representation may be made darker, brighter, more heavily patterned, or the like, to indicate that the user has spent a greater amount of time viewing or interacting with the corresponding content presented in the interface 2902. Accordingly, if the user quickly scrolls through the scrollable content 2004 in a manner that is essentially too fast to read, very little change may occur to the consumption representation 2900. On the other hand, if the user slowly scrolls through the scrollable content at a speed that is deemed appropriate for reading the content, and possibly dependent upon the amount of the content in the scrollable content, the consumption representation 2902 may be visually changed in the manner shown at portions 2910, 2912 and 2914 to indicate that corresponding portions of content have been consumed.

Figure 30:
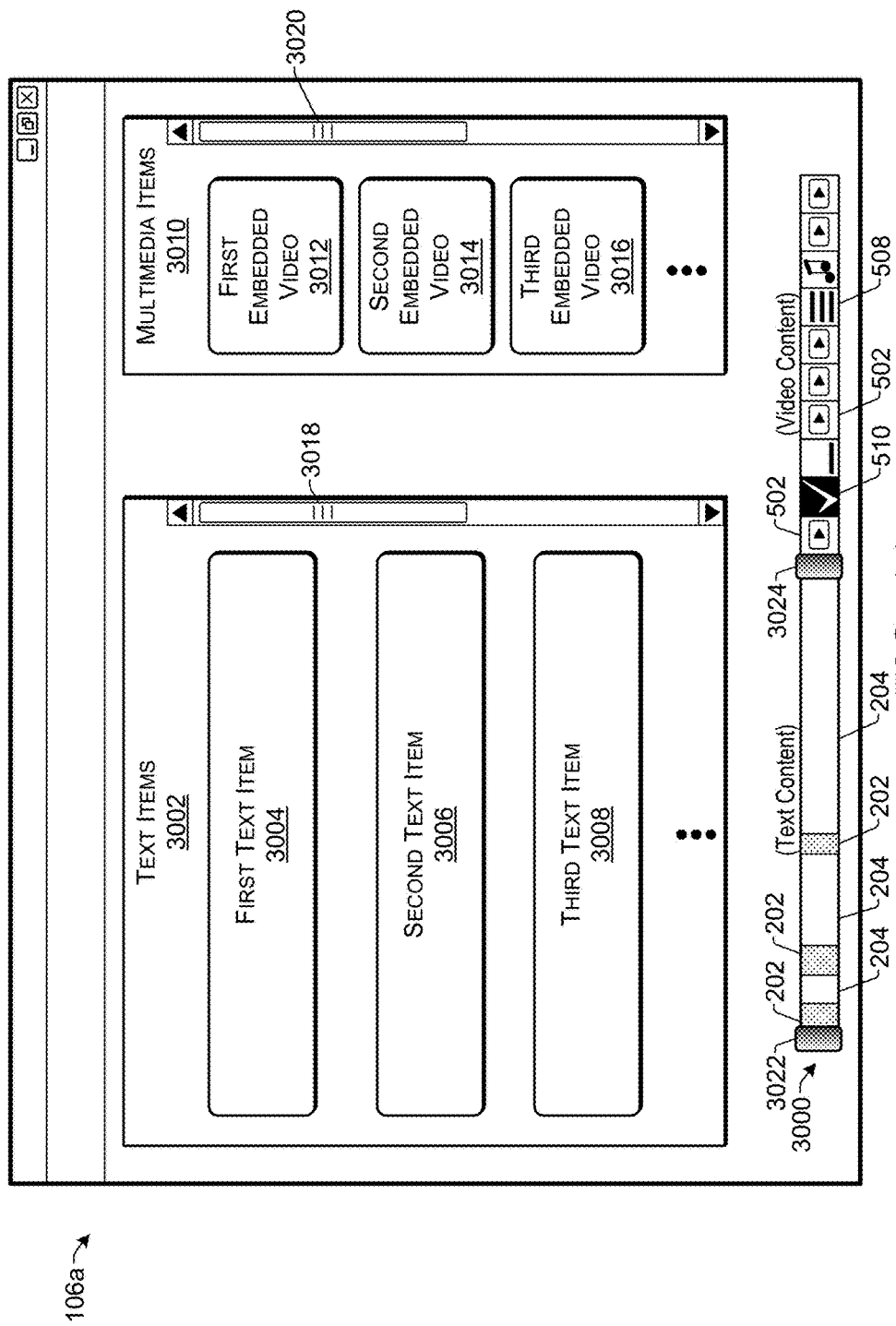
FIG. 30 illustrates an example consumption representation for a content item such as a webpage according to some implementations.

FIG. 30 illustrates an example consumption representation 3000 that may be presented overlaid on a webpage or other combined media content item 106a having both text content and multimedia content according to some implementations. For example, the user may access the content item 106a, which may have a plurality of text items 3002, such as a first text item 3004, a second text item 3006, a third text item 3008, and so forth. The content item 106a may further include one or more multimedia items 3010, such as a first embedded video 3012, a second embedded video 3014, a third embedded video 3016, and so forth. The user may be able to scroll through the text items using a scroll handle 3018 or through the multimedia items using a scroll handle 3020.

The consumption representation 3000 may indicate to the user whether one or more of the text items 3002 and/or one or more of the multimedia items 3010 have already been consumed at least in part by the user. For example, the consumption representation 3000 may include a first handle 3022 for movement through the text items and a second handle 3024 for movement through the multimedia items. If the user moves the scroll handle 3018 down to the fourth text item, the first handle 3022 may slide along the consumption representation 3000 to a location corresponding to the fourth text item. Furthermore, the consumption representation 3000 may indicate portions of content that have already consumed in this content item 106a, or in other content items that contain the same portions of content, so that the user may avoid having to reread or read play those portions of content that have already been consumed. For example, suppose that the content item 106a is a webpage, and that user has already viewed the second embedded video 3014 on a different webpage. The consumption representation 3000 may indicate this at 510 so that the user may avoid replaying this content. For example, the second embedded video may be identified by a uniform resource locator (URL) at which the second embedded video is stored, or by any other suitable identification techniques. In some examples, as discussed below, the electronic device 100 may track and keep logs of the content consumed by the user so that the electronic device 100 may identify content previously consumed by the user.

Figure 31:
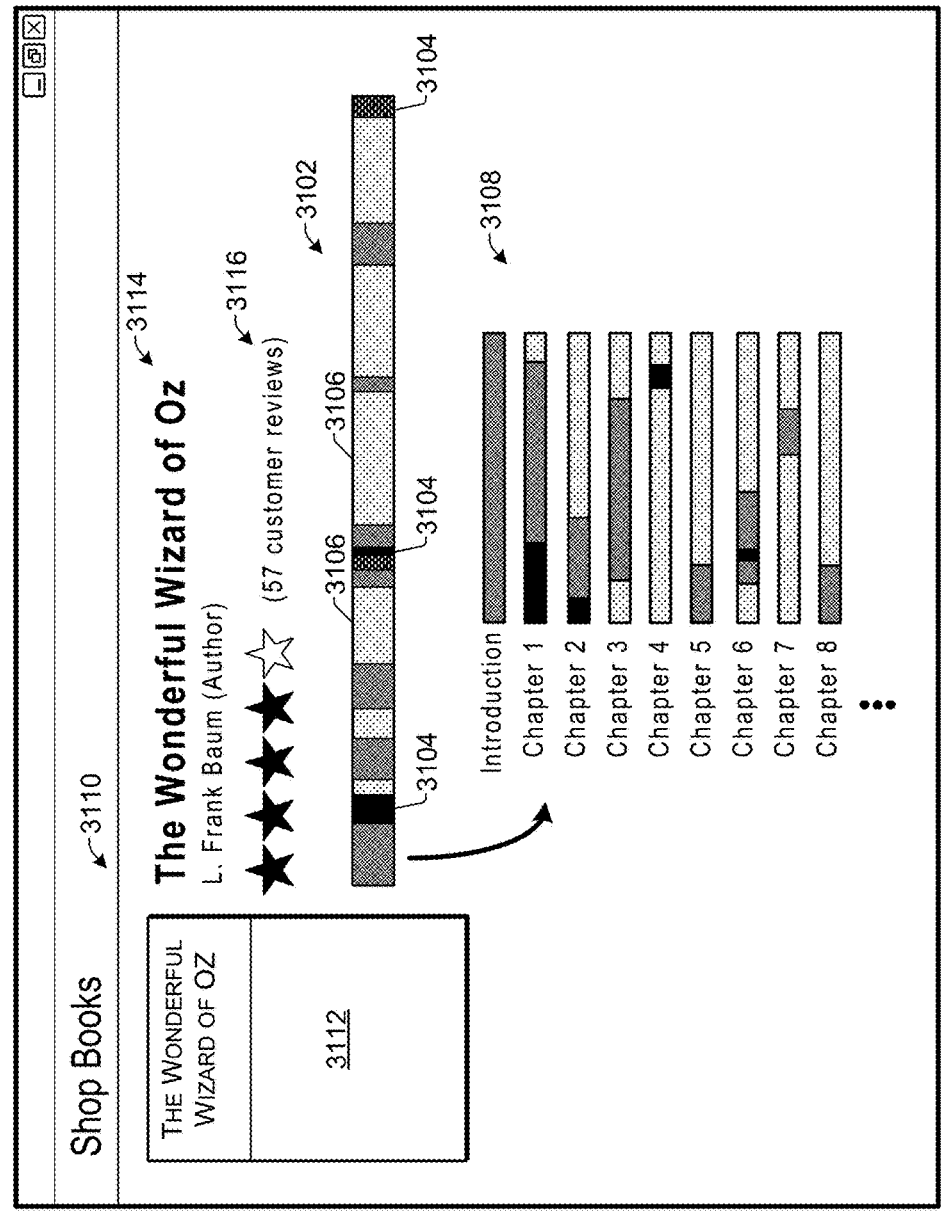
FIG. 31 illustrates an example aggregated consumption representation for a content item according to some implementations.

FIG. 31 illustrates an example user interface 3100 that may be presented to a user, such as during shopping for a content item, e.g., an eBook, a movie, a music album, or the like, according to some implementations. A content provider may receive, from a plurality of users, consumption information related to the user's progress through a particular content item. For example, suppose that the content provider has obtained consumption information from a plurality of users for *The Wonderful Wizard of Oz*, and has aggregated that information to determine which portions of the book users spend the most time reading, rereading and the like. Accordingly, the content provider may display an aggregated consumption information representation 3102 that shows which portions of the book have been most highly accessed or consumed by other users. As one example, darker or more heavily patterned portions 3104 of the representation 3102 may indicate heavily trafficked or frequently consumed portions of the book, while lighter portions 3106 may represent less frequently consumed portions of the book.

Additionally, in some implementations, as indicated at 3108 the aggregated consumption information may be broken down into representations of individual chapters or sections of the book, tracks of an album, and the like. Accordingly, the content provider may offer the user the opportunity to sample a portion of the book and the user may be able to select the portion to sample based on the indications in the aggregated consumption information regarding which portions are most popular among users who have actually read the book. Similarly, in the case that the content item is a song or movie, the user may select a portion to sample based on the portions that are most listened to or most viewed by other users who have already purchased the content item.

In some examples, the aggregated consumption information representation 3102 may be displayed in conjunction with an offer 3110 for sale or license of a content item that may include an image 3112 of the content item, a title 3114 of the content item, customer reviews 3116, and the like. Furthermore, as another example, the aggregated consumption information representation 3102 presented to a particular user may be personalized for that user. For instance, the user's profile, past purchases, and the like, may be matched with a profile of other users who have consumed the content item and the consumption information from only those other users may be used when generating the aggregated consumption information representation 3102. This may tend to indicate to the particular user a more useful aggregated consumption information representation that is based on the user's own interests, reading habits, and the like.

Figure 32:
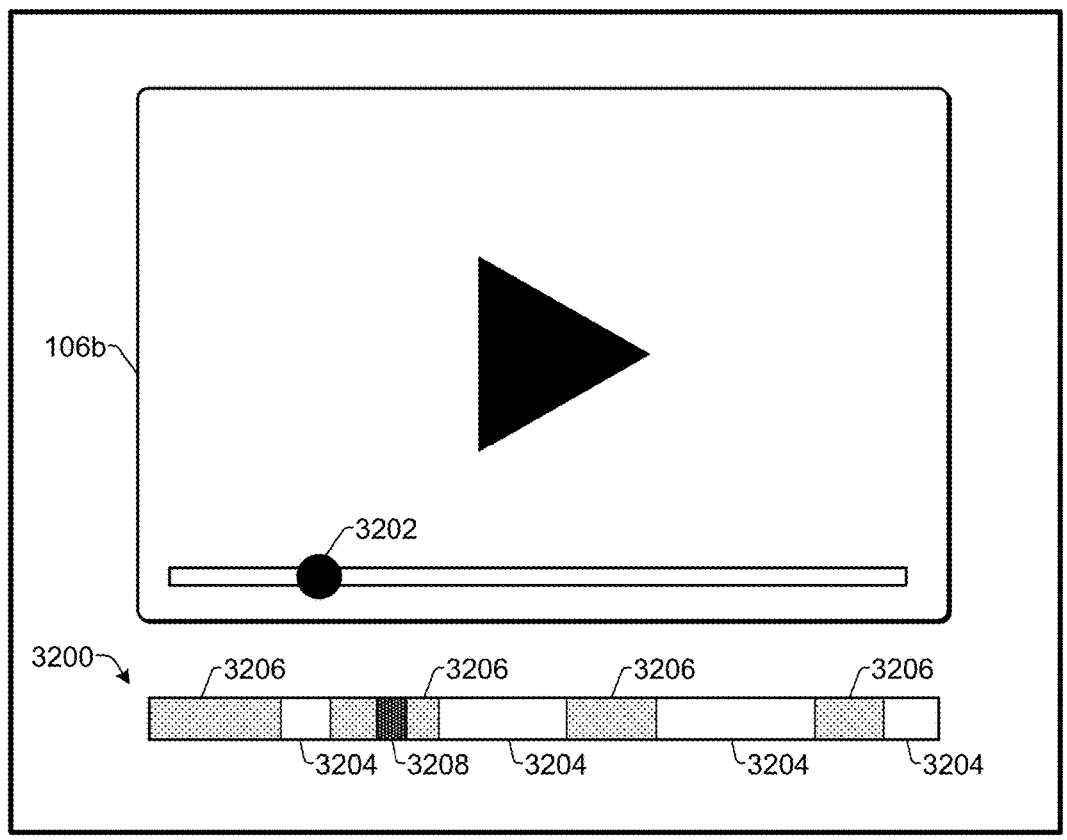
FIG. 32 illustrates an example consumption representation for a multimedia content item according to some implementations.

FIG. 32 illustrates an example consumption representation 3200 that may be provided in connection with a multimedia content item according to some implementations. For example, a media content item 106b, such as a movie, video, song, music album, may include a control 3202 which may enable scrubbing, i.e., fast-forward or rewind of the content by movement of the control 3202 in the forward or reverse direction respectively. The consumption representation 3200 may track the speed at which the content item 106b is consumed for determining whether to mark a certain portion as having been consumed on the consumption representation 3200. For example, if the user allows the content item to play at normal speed, it may be assumed that the user has viewed or otherwise consumed the content. Furthermore, if the user scrubs back-and-forth several times over a particular portion of the content it may also be assumed that the user has consumed the content. However, similar to the example discussed above for scrolling, if the user scrubs the control 3202 at a first speed, which may be too fast to actually comprehend the content, no visual distinction may be made in the consumption representation 3200, as indicated at 3204. If the user scrubs the control 3202 at a second, slower speed at which the user may be able to comprehend the content, the consumption representation 3200 may be visually changed, as indicated at 3206, in a manner as if the user had let the content play at normal speed or, alternatively, in a different manner to distinguish comprehensible scrubbing from normal playback. Furthermore, if the user replays a certain portion of content one or more times, the portion of the representation corresponding to that content may be visually distinguished by an additional amount, as indicated at 3208.

Figure 33:
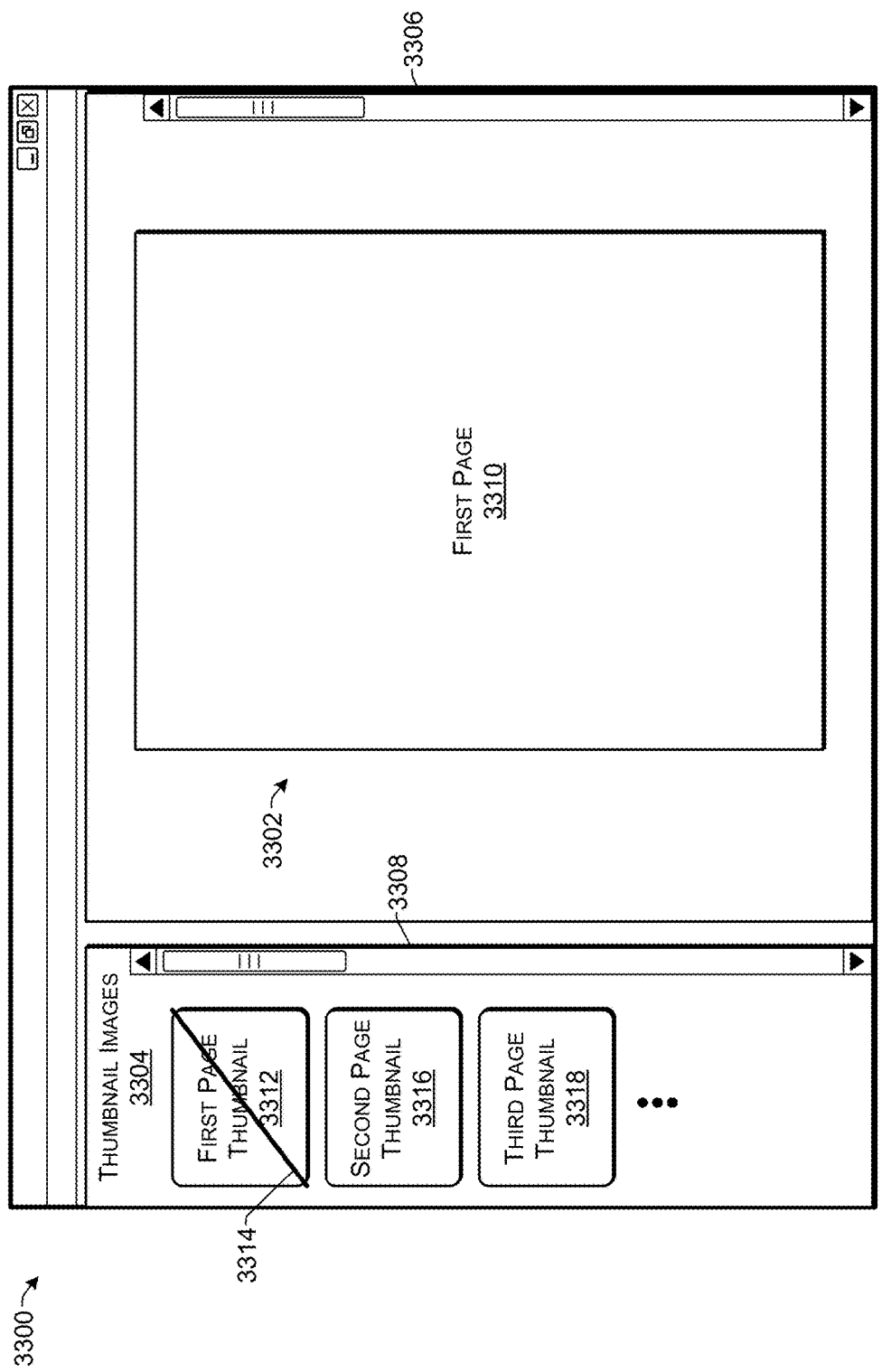
FIG. 33 illustrates an example consumption representation for a document content item according to some implementations.

FIG. 33 illustrates an example interface 3300 in which consumption of a document or other content item may be tracked using thumbnails of the document according to some implementations. For example, suppose the interface 3300 displays a document 3302 along with thumbnail images 3304 of each page of the document. Accordingly, in the illustrated example the user may scroll through the document using a scrollbar 3306. Alternatively, the user may scroll through the thumbnail images 3304 using a scrollbar 3308.

As one example, if the user spends a sufficient amount of time to consume the content of a first page 3310 of the document 3302, a first page thumbnail image 3312 corresponding to the first page 3310 may be marked or otherwise visually distinguished as having been consumed, such as with a marking 3314. The other thumbnail images, such as a second page thumbnail image 3316 and a third page thumbnail image 3318, may remain unmarked until it has been determined that the user has consumed the content of the corresponding pages of the document 3302. Consequently, by scrolling through the thumbnails 3304, the user may quickly determine which portions of the content the user has already consumed.

From the foregoing examples, it may be seen that numerous different types of consumption representations may be generated for a content item and may thereby enhance the presentation of the content item. Thus, while several examples have been provided herein for discussion purposes, implementations herein are not limited to the particular examples provided and discussed, but may be extended to other types of content items, other types of representations, graphics effects and schemes, other types of user interfaces, and the like, as will be apparent to those of skill in the art in light of the disclosure herein.

Furthermore, in some examples, different users may share an electronic device and/or a library of content items. Thus, consumption information for a first user may be maintained separately with respect to a particular content item 106 from consumption information for a second user with respect to that content item 106. For example, the second user may log on to a shared electronic device 100 using a different user name from the first user and may have personalized consumption information presented for each particular content item 106 shared on the electronic device 100 or shared through a common user account. Accordingly, the electronic device 100 and/or a content provider may maintain consumption information for each user so that when a particular user accesses the content item during a subsequent session, the user's progress is properly maintained and displayed in the same manner as when the user finished an immediately previous session of interacting with the content item.

In some cases, a user may have multiple devices associated with a user account, each of which may be authorized to display a particular content item. Consumption information for an instance of a particular content item on a first user device may be synchronized or merged with consumption information for the another instance of the same content item on one or more of the user's other devices. For example, the consumption information may be sent to a content provider, exclusive of the content item or the consumed content, and may be synchronized to one or more other user devices. In some examples, when the user accesses the particular content item on the one or more other devices, the consumption information synchronized to that device may be used to present the particular content item with the same consumption information displayed as on the first user device.

Example Architecture

Figure 34:
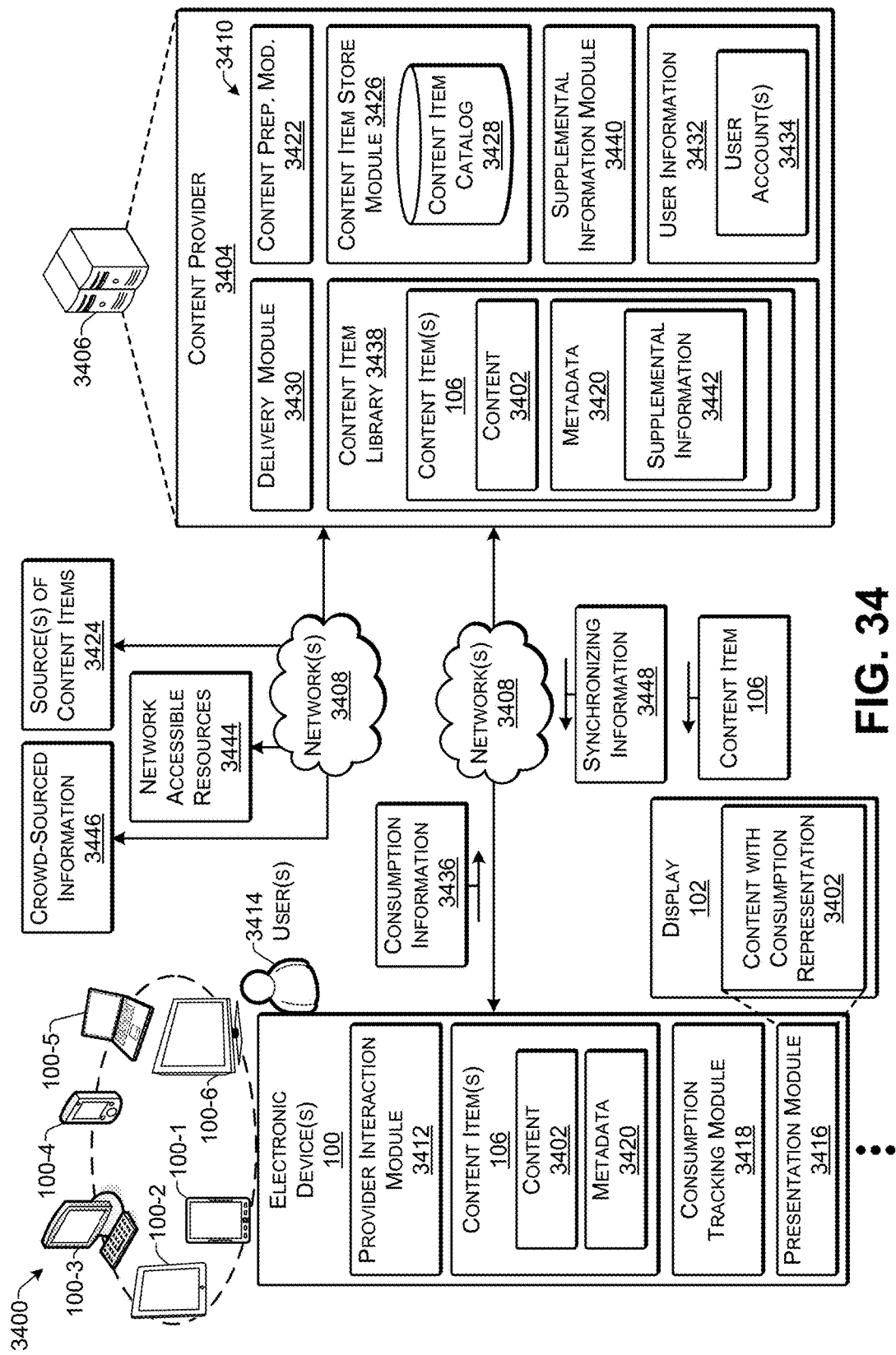
FIG. 34 illustrates an example system for enabling content item consumption representations according to some implementations herein

FIG. 34 illustrates an example architecture of a system 3400 to provide a consumption representation for a content item according to some implementations. In some examples, a content item 106 that includes content 3402 with a consumption representation may be presented by one or more electronic devices 100 capable of displaying, rendering or otherwise presenting the content item 106, such as on an associated display 102. Some examples of the electronic device(s) 100 may include digital media devices and eBook readers 100-1; tablet computing devices 100-2; desktop, terminal and workstation computing devices 100-3; smart phones and mobile devices 100-4; laptop and netbook computing devices 100-5; televisions, gaming systems, and home and automotive electronic devices 100-6; and any other device capable of accessing and rendering or playing content items, online content, mobile content, textual content, multimedia content, or the like.

In the illustrated example, the electronic device 100 is able to communicate with a content provider 3404. For instance, the electronic device 100 may communicate with one or more computing devices 3406 of the content provider 3404, to access or receive at least one content item 106 over one or more networks 3408. For example, the network(s) 3408 may include a local area network (LAN), a wide area network (WAN), such as the Internet, or any combination thereof, and may include both wired and wireless communication technologies using any suitable protocols and communication techniques. The computing device 3406 of the content provider and the electronic device 100 may communicate and interact with one another using any combination of suitable communication and networking protocols, such as Internet protocol (IP), transmission control protocol (TCP), hypertext transfer protocol (HTTP), and so forth. In some cases, the electronic device 100 may download one or more content items 106, while in other cases the content items 106 may be streamed to the electronic device 100.

The content provider 3404 may maintain an online location or site 3410, such as a merchant website, an e-commerce site, or other functionality that offers one or more content items 106 to the public. For example, the content provider site 3410 may be hosted on one or more of the computing devices 3406. In some cases, the host computing devices 3406 may be one or more web servers located at a data center, server farm, or other single physical location. In other cases, the content provider site 3410 or portions thereof may be located in diverse locations that are physically remote from one another. Further, in some implementations, the content provider site 3410 may be a group of websites, data stores, services, and the like, hosted on a plurality of different host computing devices 3406 in a plurality of diverse locations, or hosted by one or more host computing devices 3406 at a single location.

In some implementations, the content provider site 3410 may offer content items 106 to the public through an online presence accessible by a web browser or other application. In some examples, the content provider site 3410 alternatively, or additionally, may provide content items 106 through an online or mobile application executing on the electronic device 100. For example, an application on the electronic device 100 may connect to or obtain content from the content provider site 3410 to enable the purchase or management of one or more content items 106, and the like.

Thus, the content provider site 3410 may enable the electronic device 100 to access content items 106 through an online or mobile application executing on a mobile device as the electronic device 100, such as an eBook reader, smart phone, tablet computing device, augmented reality device, or the like. Accordingly, the content provider site 3410 is not limited to a website accessed by a browser, but may encompass other technologies for marketing and providing content items 106, such as through in-application shopping, and the like.

The electronic device 100 may include a provider interaction module 3412, which in some instances may be an application, such as a web browser, mobile application, or other module or computer program configured to receive web content, webviews, online content, or the like, for accessing and interacting with one or more modules of the content provider 3404. For example, the provider interaction module 3412 may enable a user 3414 to shop for content items at the content provider site 3410 and access or receive content items 106 from the content provider site 3410, such as by downloading through the network 3408. Further, in some implementations, the provider interaction module 3412 may enable the user 3414 to organize or manage the content items 106 on the electronic device 100, while in other implementations a separate management module (not shown) may provide this functionality.

The electronic device 100 may include a content item presentation module 3416, a consumption tracking module 3418, and at least one content item 106. In some implementations, the presentation module 3416, the consumption tracking module 3418, and the provider interaction module 3412 may be separate modules or applications. In other implementations, the presentation module 3416, the consumption tracking module 3418, and the provider interaction module 3412 may both be part of the same application or computer program for accessing and presenting content on the electronic device 100. In yet other implementations, the presentation module 3416, the consumption tracking module 3418, and the provider interaction module 3412 may represent different functionalities of the same module.

As one example, the presentation module 3416 may present content 3402 of a content item 106 on the display 102. In some examples, the display 102 may be part of the electronic device 100, and/or unitary with the electronic device 100. In other examples, the display 102 may be separate from the electronic device 100 and connected to or coupled with the electronic device 100. In any case, the presentation module 3416 may render content 3402 of one or more of the content items 106 on the display 102 for viewing by the user 3414. The presentation module 3416 may further display content 3402 having a consumption representation as described above with respect to FIGS. 1-33. For example, the content 3402 of the content item 106 may be contained in at least one content file. Thus, the presentation module 3416 may control which portions of the content 3402 are presented, and may further generate the consumption representation(s) corresponding to the presented content when the content item 106 is presented on the display 102. The presentation module 3416 may also control the visual effects, graphics schemes, magnification effects, and so forth used to present the consumption representation(s).

In addition, the electronic device 100 may include the consumption tracking module 3418 that may be executed to track the consumption of a user with respect to each content item 106. For example, with respect to a paginated content, the consumption tracking module 3418 may determine an amount of time that a user spends on each page of content, and may compare that amount of time with a timing threshold for determining whether the user has consumed the page of content. As discussed above, the timing threshold may be based at least in part on an amount of content contained on a particular page of the content item that the user is currently viewing. For example, a page with a small amount text or a simple image may be consumed in substantially less time than a page with a large amount of text or complex images. Similarly, with respect to multimedia content, the consumption tracking module 3418 may assume that the content has been consumed when the multimedia content is played at normal speed. Additionally, in the case of high-speed scrubbing, the consumption tracking module 3418 may apply a timing threshold to determine whether the content is comprehensible to a user and/or may determine a number of times that a particular portion is viewed during scrubbing, or the like. In some examples, the consumption tracking module 3418 may apply or may incorporate a classifier to establish a probability or confidence level for classifying each particular portion of content as either consumed or not consumed. Machine learning and statistical model training may be applied to the consumption tracking module 3418 to refine the classifier based on empirical data and/or feedback from users. Additionally, in some examples, the consumption tracking module 3418 may employ gaze tracking or other techniques for determining, at least in part, whether a user has consumed a particular portion of content.

Further, in some examples, the content item 106 may include metadata 3420 that is associated with the particular instance of the content item 106, such as in one or more metadata files. In some examples, the metadata 3420 may receive or may contain data collected by the consumption tracking module 3418 related to the consumption of various portions of the content. For example, the consumption tracking module 3418 may store consumption logs or other information related to the portions of content that have been classified as having been consumed by a user with respect to a particular content item. For instance, the consumption logs for each content item may indicate a range of content that has been consumed with respect to a particular content item. The presentation module 3416 may access and use the consumption logs to generate a current consumption representation for the particular content item. The consumption information and logs may be stored with the metadata 3420 for a particular content item 106, may be stored in other locations on the electronic device 100, and/or may be sent to a content provider, as discussed below. In some examples, the metadata 3420 may be contained in a separate file from the content 3402, while in other examples, the metadata 3420 may be combined with the content 3402 into a single file.

The presentation module 3416 may present one or more interfaces that include consumption representations as described. Thus, the presentation module 3416 may generate and display the consumption representations and other interfaces described herein to provide an indication of a user's progress with respect to a particular content item. In some examples, the interfaces and consumption representations may be overlaid on the content 3402 by the presentation module 3416 at a designated location. For instance, in some cases, the interfaces and consumption representations may be generated using any of HTML (hypertext markup language), JavaScript®, CSS (Cascading Style Sheets), widgets, or any combination thereof, or any other suitable technology. For instance, as defined by the World Wide Web Consortium (W3C), a widget is an interactive single purpose application for displaying and/or updating local data or data from the Web, which may be packaged in a way to allow a single download and installation on a user's computing device, a mobile device, or the like. In addition, graphic effects such as shapes, colored text, colored or patterned backgrounds, highlighting, outlining or other graphic effects, may be generated using any suitable coding techniques, such as HTML, JavaScript®, CSS, and various other graphics rendering software. Further, widgets, HTML, JavaScript®, and CSS are just several examples of technologies for displaying the interfaces and consumption representations described herein, and numerous other possible techniques, tools, functionalities, programming technologies, and the like will be apparent to those of skill in the art in light of the disclosure herein.

In some implementations, each content item 106 may include content 3402, such as text, images, audio, video, or the like, and may further include the metadata 3420 that is associated with the content item content 3402. For example, the content provider 3404, the author, the publisher, etc., may provide or may generate at least a portion of the metadata 3420 for a corresponding content item 106. As mentioned above, each instance of a content item 106 may be made up of any number of files or may be a single file. In some examples, the content provider 3404 may generate the metadata 3420 for a respective content item 106 to provide information related to the content 3402 of the content item 106. For instance, the content provider 3404 may include a content item preparation module 3422 that may receive a raw content item from one or more sources 3424 of content items. The sources 3424 of content items may be publishers, authors, movie distributors, studios, music companies, artists, and so forth.

In the case of textual content items 106, the content item preparation module 3422 may parse and process the text of the raw content item to produce the content 3402 that is compatible with various display formats, device platforms, and so forth. The content item preparation module 3422 may further parse and analyze a raw content item to produce at least a portion of the metadata 3420 that corresponds to the content item 106. For example, the metadata 3420 may include a variety of information, such as a language in which the content is written and location information that identifies location of portions of content within the content item. In some examples, the metadata 3420 may further identify the parts of speech contained in the content and the location of each part of speech contained in the content, location of each word, location of each character, or the like. For example, the content provider 3404 may parse the content 3402 into parts of speech, identify each part of speech, and associate a location in the content item with each part of speech. The metadata 3420 or the content 3402 may further include information that identifies the locations of individual sentences, paragraphs, chapters, and so forth in the content item. In some cases, the location information included with the metadata 3420 or the content 3402 may be used, at least in part, to enable identification of portions of the content 3402 that have been consumed and/or for identifying location of chapter breaks and the like in the consumption representations. For example, the location of a word, sentence, chapter, and so forth, may be identified by referring to the location information. Thus, during presentation of the content item 106, the presentation module may use the location information, at least in part, to determine which portions of the content item have been consumed.

The content provider site 3410 may include a content item store module 3426 that may provide or may access a content item catalog 3428. For example, the content item store module 3426 may present the content item catalog 3428 to the provider interaction module 3412 of an electronic device 100 that accesses the content provider site 3410 to shop for a content item 106. The content item catalog 3428 may include searchable and/or browsable listings and descriptions of content items 106 available from the content provider site 3410. The content item store module 3426 may communicate with the provider interaction module 3412 on the electronic device 100 to enable the user 3414 to locate and acquire a content item 106 from the content provider site 3410. As one example, the content item store module 3426 may present the example interface 3100 discussed above with respect to FIG. 31 which may include aggregated consumption representation 3102 in connection with offering a content item 106 for sale, licensing, or other acquisition.

The content provider site 3410 may further include a delivery module 3430 that may deliver (or make available for delivery) a content item 106 to the electronic device 100 and/or the user 3414. For example, in some instances, the delivery module 3430 may facilitate the download of a content item 106 to the electronic device 100 over the network(s) 3408. In other instances, the delivery module 3430 may provide for delivery of a hard copy of a content item 106 to the user 3414, such as by delivery of a storage medium that maintains a copy of the content item, depending on the nature of the content item and the electronic device 100.

Furthermore, in some implementations, the delivery module 3430 may refer to user information 3432 to determine one or more content items 106 to download to the electronic device 100. For example, the user information 3432 may include user account(s) 3434, such as user contact information, a purchase history, a user content item library, information on various devices 100 associated with a particular user account 3434, or other records of content items purchased by the user 3414, as well as other transactions of the content provider 3404 with the user 3414. Accordingly, in some cases, the delivery module 3430 may assist in synchronizing the content of multiple devices 100 of a user or a user account, such as for delivering and synchronizing multiple instances of a content item 106 on multiple devices 100 associated with a single account. In some cases, the user information 3432 may include user account information for a plurality of users 3414 of the content provider site 3410. For example, the user information 3432 may include a user account 3434 for each user for identifying and interacting with the user, such as name, email address, mailing address, telephone number, user identification (ID) number, user purchase history (e.g., content items 106 acquired by the user), usage and interaction information, and so forth.

In some examples, the electronic device 100 may send consumption information 3436 to the content provider 3404 for inclusion with other information in the user's account 3434. For instance, the consumption information 3436 may include information indicating which portions of content have been consumed by a user for each content item 106 accessed by the user 3414. Thus, in the case of a book, the consumption information 3436 may indicate at least locations in the book of content portions that were consumed by the user. In some examples, the consumption information 3436 may further indicate an amount of time that the user spent consuming each portion of content. Further, extremely long time outliers may be discarded, as these may be an indication that the user was not actually consuming the content during that entire time. In some examples, the consumption information 3436 of a plurality of different users associated with different user accounts may be collected and aggregated to determine which portions of content are popularly or most frequently consumed for a particular content item, as discussed above with respect to FIG. 31. This information may then be used for various purposes, such as for suggesting to subsequent users portions of the content item to sample during shopping, or merely to inform users as to which parts of content item are most popularly consumed by other users. Further, the consumption information 3436 for a particular user account may be used to synchronize or merge the consumption of a user on a first user device 100 with other instances of a particular content item on other devices 100 associated with the particular user's account.

The content provider site 3410 may also include or may access a content item library 3438. For example, the content item library 3438 may include a plurality of content items 106 that the content provider 3404 has available for access by electronic devices 100, such as by purchase through the content items catalog 3428. Each content item 106 in the content item library 3438 may include both content 3402 and metadata 3420 corresponding to the content. In some examples, the content item library 3438 may contain hundreds of thousands of unique content items 106, including a variety of eBooks, such as fiction, non-fiction, and so forth, as well as multimedia content items, mixed media content items, and so forth.

Further, in some implementations, a content item 106 to be delivered may be provided to a third party, such as a wireless provider that sends the content item 106 to the electronic device 100. Accordingly, an intermediary, such as a wireless network provider (not shown), or the like, may make the content item 106 available for delivery to a particular electronic device 100, or may otherwise provide the content item to the particular electronic device 100, and may further provide for synchronization of metadata, such as the consumption information 3436, to other devices 100 of a user. For purposes of this disclosure, "providing" or "making available" by the content provider may include any intermediaries that perform delivery of the content items and/or consumption information related to the content items, such as in metadata 3420.

The content provider site 3410 may also include various other site components as is known, depending on the design and intended use of the content provider site 3410. Such other site components may include one or more pages of content, such as webpages, webviews, or other online content, that may be presented to the user 3414 through the provider interaction module 3412, such as during shopping for content items 106 from the content provider site 3410.

The content provider site 3410 may further include a supplemental information module 3440 that may be employed in some implementations for generating and managing supplemental information 3442 that may be used to identify various aspects and objects of a content item that may be selected to be included with the consumption representation, as discussed above with respect to FIGS. 27 and 28. In some examples, when the user 3414 of the electronic device 100 accesses, purchases or otherwise obtains a particular content item 106, such as through interaction with the content provider 3404, the content provider 3404 may make the particular content item 106, including the corresponding content 3402 and metadata 3420, available for delivery to the electronic device 100. In some cases, the supplemental information 3442 is included in the same file as the content 3402, while in other cases, the supplemental information 3442 may be maintained in metadata 3420 corresponding to the particular content item 106, which may be a separate file from the content 3402.

The supplemental information module 3440 may operate on the content items 106 in the content item library 3438 to produce the supplemental information 3442. For example, the supplemental information module 3440 may select a particular content item 106 from the content item library 3438 for generating supplemental information 3442 for the particular content item 106. The supplemental information module 3440 may parse and index the content item 106 by identifying characters, people, things, phrases, places, topics, organizations, themes, and so forth, which are of significance in the content item. In some examples, the supplemental information module 3440 may access various authoritative sources of information, as well as performing statistical analysis and modeling to identify the significant entities, terms, objects, or other aspects in the particular content item 106. Thus, during the parsing, the supplemental information module 3440 may identify candidate aspects that are candidates to make into selectable objects or terms for the content item. The supplemental information module 3440 may identify proper names, place names, statistically improbable phrases, and the like, in the text of the content item. A statistically improbable phrase is a word or combination of words that occur in the text of a content item one or more times in a manner that is outside of a predetermined threshold. For example, if a particular phrase is used multiple times in a content item, while not being used or being used rarely in other content items in a corpus of content items, this may be a statistically improbable phrase that is a candidate to become a selectable term of the content item.

To determine which candidate objects and terms to make into selectable objects and terms, the supplemental information module 3440 may access external sources of information outside the content item. For example, the supplemental information module 3440 may access network accessible resources 3444 that may include online sources of information, such as Wikipedia®, Shelfari® and IMDb® (Internet Movie Database), online dictionaries, online encyclopedias, wikis, online reference sites, discussion forums, or other online resources, to determine identification of characters and other significant phrases, things, events, or places in a content item 106. Further, the supplemental information module 3440 may obtain additional information on the statistically improbable phrases in the particular content item 106, such as by obtaining definitions or other information for these phrases from various locations, such as the authoritative sources mentioned above.

Additionally, in some examples, the supplemental information module 3440 may utilize or may access crowd-sourced information 3446 for further identifying objects or terms of a content item to make into selectable objects or terms that may be selected in the text of the content item. For example, websites such as Shelfari® may allow users to add crowd-sourced information related to characters, places, topics, etc., in a content item. Further, crowd-sourced information 3446 may also include information received from users 3414 of electronic devices 100 to correct errors in location information for portions of a content item, misidentification of terms, and the like. Users 3414 may also assist in identifying alternate names for characters, identifying topics, identifying text related to themes, relationships, events, character interactions, and so forth. Additional details of generating the supplemental information 3442 are described in U.S. patent application Ser. No. 13/246,759, filed Sep. 27, 2011, which has been incorporated herein by reference in its entirety.

The supplemental information 3442 generated for each content item may be stored in the metadata 3420 for the particular content item 106, or other suitable location. When the user 3414 acquires a particular content item 106, such as through interaction with the content item store module 3426, the delivery module 3430 may deliver the particular content item 106 to the electronic device 100, and may also deliver the corresponding supplemental information 3442 for the particular content item, such as with the metadata 3420. For example, the particular content item 106 including the corresponding supplemental information 3442 and metadata 3420 may be downloaded contemporaneously from the content item provider site 3410, e.g., as a package or as a sequential download.

In some examples, the user 3414 may consume a portion of the content 3402 after obtaining a particular instance of a content item 106. The consumption information 3436 is sent from the user's device 100 to the content provider site 3410. The consumption information 3436 may be indicative of which portions of the content item 106 have been consumed by the user. As one example, the consumption information 3436 may include location information indicating a location in the content item of one or more portions or ranges of content that have been consumed. As another example, the consumption information 3436 may include a bitmap or graphic representation of the portions of the content item that have been consumed, or may otherwise identify the one or more consumed portions of content. The delivery module 3430 may receive the consumption information 3436 and add the consumption information 3436 obtained from the particular user to the user information 3432, such as to a user's account 3434 associated with the particular electronic device 100 from which the consumption information 3436 was received.

In some cases, the consumption information 3436 received from the user device 100 may be synchronized by the delivery module 3430 with other devices 100 associated with the particular user or user account. For example, the delivery module 3430 may make available for delivery at least synchronizing information 3448 that may be delivered to the user device(s) 100 associated with the particular user, so that when the particular user accesses another instance of the same content item 106 on a different user device 100 associated with the user 3414, the consumption representation may accurately represent the portions of content already consumed in the same manner as on the first user device 100. The synchronizing information 3448 may be received by the other electronic device(s) 100 of the particular user, and may be employed the next time that the user accesses the particular content item 106 on the other electronic device(s) 100. Accordingly, consumption information 3436 regarding one or more portions of content consumed by a user using any of a plurality the electronic devices 100 associated with a particular user account, user login ID, or a particular content item library, may be propagated automatically across the plurality of electronic devices 100.

Additionally, in some examples, the user 3414 may have the option to specify whether consumption information regarding consumption of content on a first electronic device 100 is also applied to one or more other electronic devices 100 associated with that user. For example, the user 3414 may specify that consumption information regarding content consumed on the first electronic device 100 is also synchronized to the other electronic devices 100 when the user 3414 accesses other instances of the same content item 106 on those devices. As another example, the user 3414 may specify that consumption information regarding content consumed on the first electronic device 100 is not propagated to a second electronic device 100 of the user. The user may have the option to set preferences for each electronic device 100, which may control whether consumption information 3436 from other devices 100 is synchronized to a particular device 100. Alternatively, when accessing each particular content item 106 on one of the other electronic devices 100, the user 3414 may be presented with pop-up menu or the like that provides the user with the option of whether or not to incorporate the consumption synchronizing information 3448 for the particular instance of the content item 106. Numerous other variations will be apparent to those of skill in the art having the benefit of the disclosure herein.

Furthermore, in the case that multiple users share an electronic device 100, a user account 3434, a content item library, or the like, and thereby share access to a particular content item 106, the content provider 3404 may enable the multiple users to set preferences and or user IDs to prevent consumption information for a particular user from being applied to a second user of the same electronic device, same user account, or same content item library.

Additionally, the supplemental information module 3440 may aggregate the consumption information 3436 collected from a plurality of users and a plurality of devices 100 associated with different user accounts. The supplemental information module 3440 may determine which portions of a particular content item are consumed most frequently, and may provide this information to the delivery module 3430 to inform users of this information. For example, when a user first opens a newly acquired content item, the user may be presented with a message that other users popularly consume one or more portions of this content item, such by displaying the aggregated consumption representation 3102 of FIG. 31 for the content item.

In addition, in some cases, the consumption information 3436 may be stored by multiple different entities. Thus, the entity that provides the content may not necessarily be the entity that receives or stores the consumption information 3436. As one example, there may be a single hosting service for consumption information that may store and track consumption of content by a particular user 3414. For example, a central service provided by the content provider 3404, or other entity, may provide an API (application programming interface) to other content providers, such as YouTube®, Facebook®, etc., so that when a content item is consumed, the central service may be notified of the identity of the content item, the portions consumed, an identity of the consumer, and so forth, so that when the user encounters the content item at a later point in time, such as through a different location, the user's progress in consuming the content item may be displayed to the user. As another alternative, various different entities may maintain histories for different content. A user may provide credentials to allow an application to obtain consumption history from the various content providers or other entities that maintain their consumption history. As still another alternative, the electronic device 100 may maintain detailed identification information for each portion of content consumed by a user, and this information may be synchronized among a plurality of the devices of the same user.

Example Electronic Device

Figure 35:
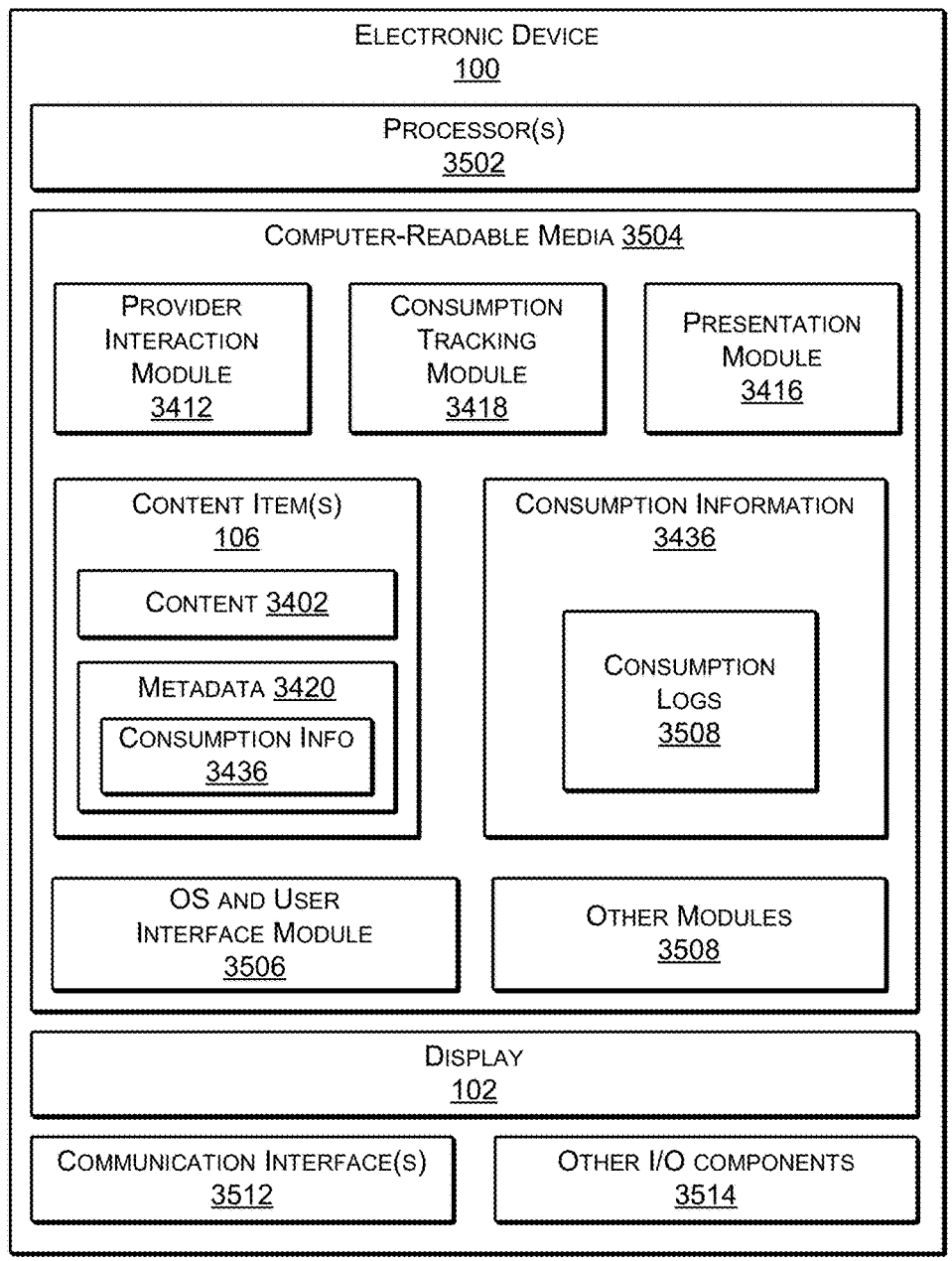
FIG. 35 illustrates select components of an example electronic device according to some implementations.

FIG. 35 illustrates select example components of the electronic device 100 that may be used to implement the functionality described above according to some implementations. In a very basic configuration, the electronic device 100 includes, or accesses, components such as at least one control logic circuit, central processing unit, or processor 3502 and one or more computer-readable media 3504. Each processor 3502 may itself comprise one or more processors or processing cores. Depending on the configuration of the electronic device 100, the computer-readable media 3504 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 3502 directly or through another computing device. Accordingly, the computer-readable media 3504 may be computer-readable media able to store and maintain instructions, modules or components executable by the processor 3502.

The computer-readable media 3504 may be used to store any number of functional components that are executable by the processor 3502. In some implementations, these functional components comprise instructions or programs that are executable by the processor 3502 and that, when executed, implement operational logic for performing the actions attributed above to the electronic device 100. Functional components of the electronic device 100 stored in the computer-readable media 3504 may include the presentation module 3416, which may be executed by the processor 3502 for presenting one or more content items 106 and associated consumption representations, and the consumption tracking module 3418, which may determine which portions of a content item have been consumed by a user. Additional functional components stored in the computer-readable media 3504 may include the provider interaction module 3412, executable by the processor 3502 for obtaining the content item(s) 106, including content 3402 as well as any corresponding metadata 3420. Other functional components may include an operating system and user interface module 3506 for controlling and managing various functions of the electronic device 100. Depending on the type of the electronic device 100, the computer-readable media 3504 may also optionally include other functional components, such as other modules 3508, which may include applications, programs, drivers and so forth.

The computer-readable media 3504 may also store data, data structures, and the like that are used by the functional components. For example, data stored by the computer-readable media 3504 may include one or more content items 106. Each content item 106 may include content 3402 and metadata 3420, which may be contained in a single file or in multiple files, and which may include the supplemental information 3442 (not shown in FIG. 35). The computer-readable media 3504 may further maintain consumption information 3436, which may include information as to which portions of each content item have been consumed. In some examples, the consumption information 3436 may be maintained with the metadata 3420 for each content item 106, while in other examples, the consumption information 3436 may be maintained separate from the content items 106 and accessed when a particular content item is accessed. In some cases, the consumption information 3436 may include one or more consumption logs 3510 that include consumption records, e.g., ranges of portions of a content item that have been consumed by a user, such as a range of pages, a start and end location of multimedia content, content item identifiers, amount of time spent consuming a portion of content, and the like. The electronic device 100 may also include other data, which may include, for example, data used by the provider interaction module 3412, the operating system and user interface module 3506, and the other modules 3508. Further, the electronic device 100 may include many other logical, programmatic and physical components, of which those described are merely examples that are related to the discussion herein.

FIG. 35 further illustrates the display 102, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. Additionally, in some implementations, the display 102 may be a 3D display capable of providing a 3D image. For example, the display 102 may produce a 3D image by providing alternating left-eye and right-eye images with or without the use of shuttering or filtering eyeglasses. Accordingly, in some implementations, the content items and user interface components herein may be rendered in 3D.

One or more communication interfaces 3512 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 3512 may allow a user of the electronic device 100 to access the World Wide Web, download content items from the content provider site 3410, access online content, such as from a website or other network location, and the like. The communication interface 3512 may further allow a user to access storage on another device, such as a user's computing device, a network attached storage device, cloud storage, or the like.

The electronic device 100 may further be equipped with various other input/output (I/O) components 3514. Such I/O components may include a touchscreen and various user controls (e.g., buttons, a joystick, a keyboard, a mouse, etc.), speakers, a microphone, a camera, connection ports, and so forth. For example, the operating system 3506 of the electronic device 100 may include suitable drivers configured to accept input from a keypad, keyboard, or other user controls and devices included as the I/O components 3514. For instance, the user controls may include page turning buttons, navigational keys, a power on/off button, selection keys, and so on. Additionally, the electronic device 100 may include various other components that are not shown, examples of which include removable storage, a power source, such as a battery and power control unit, a global positioning system (GPS) device, a PC Card component, and so forth.

Example Computing Device(s)

Figure 36:
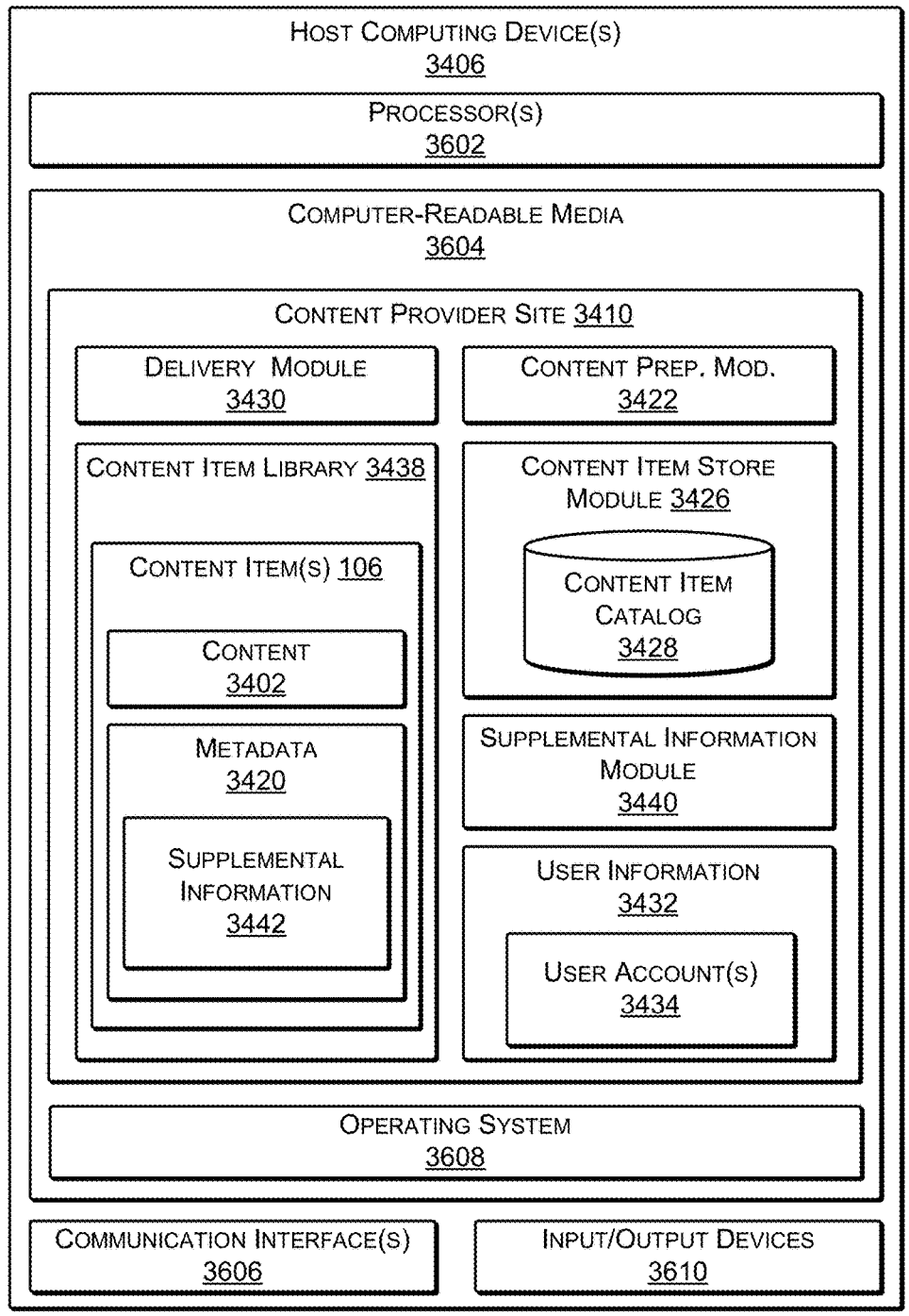
FIG. 36 illustrates select components of one or more example host computing devices of a content provider according to some implementations.

FIG. 36 illustrates select components of one or more host computing devices 3406 that may be used to implement the functionality of the content provider site 3410 according to some implementations. The content provider site 3410 may be hosted on one or more servers or other types of computing devices that may be embodied in any number of ways. For instance, in the case of a server, the content provider site 3410 may be implemented on a single server, a cluster of servers, a server farm or data center, a cloud hosted computing service, and so forth, although other computer architectures (e.g., a mainframe architecture) may also be used. Further, while the figures illustrate the components of the content provider site 3410 as being present in a single location, it is to be appreciated that these components may be distributed across different computing devices and locations in any manner. Generally, the content provider site 3410 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 36, an example host computing device 3406 includes one or more processors 3602, one or more computer-readable media 3604, and one or more communication interfaces 3606. The processor(s) 3602 may be a single processing unit or a number of processing units, and may include single or multiple computing units or multiple processing cores. The processor(s) 3602 can be configured to fetch and execute computer-readable instructions stored in the computer-readable media 3604 or other computer-readable media.

The computer-readable media 3604 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 3406, the computer-readable media 3604 may be a type of computer-readable storage media and may be a tangible non-transitory storage media.

The computer-readable media 3604 may be used to store any number of functional components that are executable by the processors 3602. In many implementations, these functional components comprise instructions or programs that are executable by the processors 3602 and that, when executed, implement operational logic for performing the actions attributed above to the content provider site 3410 and content provider 3404. Functional components of the content provider site 3410 that may be executed on the processors 3602 for implementing the various functions and features related to providing content items and consumption representations, as described herein, include the content preparation module 3422, the content item store module 3426, the delivery module 3430, and the supplemental information module 3440. Additional functional components stored in the computer-readable media 3604 may include an operating system 3608 for controlling and managing various functions of the host computing device(s) 3406.

In addition, the computer-readable media 3604 may include, or the host computing device(s) 3406 may access, data that may include the content item library 3438, including one or more content items 106. The data may further include the user information 3432, including information for one or more user accounts 3434. In addition, the computer-readable media 3604 may store or the host computing devices(s) 3406 may access the content item catalog 3428 used by the content item store module 3426. The host computing device(s) 3406 may also include many other logical, programmatic and physical components, of which those described above are merely examples that are related to the discussion herein.

The communication interface(s) 3606 may include one or more interfaces and hardware components for enabling communication with various other devices, such as the electronic devices 100, over the network(s) 3408. For example, communication interface(s) 3606 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 3408 may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 3406 may further be equipped with various input/output devices 3610. Such I/O devices 3610 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Example Processes

FIGS. 37-40 illustrate example processes for providing consumption information in connection with a content item according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

Figure 37:
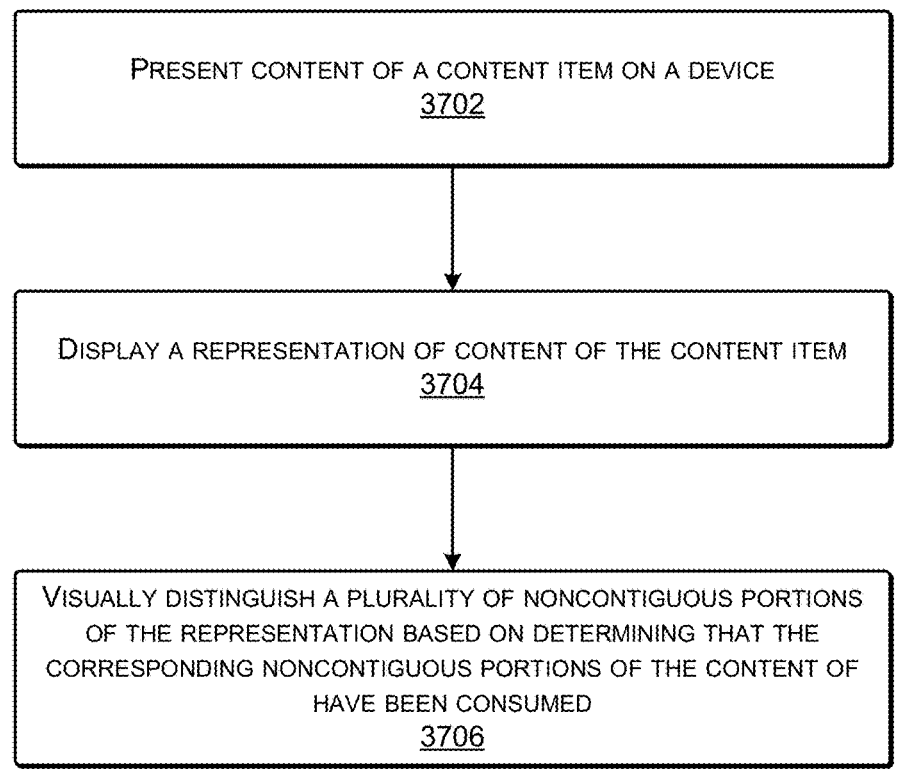
FIG. 37 is a flow diagram illustrating an example process that may be executed by an electronic device for providing a consumption representation for a content item according to some implementations.

FIG. 37 is a flow diagram illustrating an example process that may be executed by an electronic device for providing a consumption representation for a content item according to some implementations.

At 3702, the electronic device may present content of the content item on a display of the electronic device. In some examples, the user may first open or access the content item prior to viewing a representation of the content of the content item that has been consumed.

At 3704, the electronic device may display a representation of content of the content item. For example, the electronic device may display a consumption representation to present an indication of one or more portions of content of the content item that have been consumed using the electronic device. In some examples, the consumption representation may include bar or area representative of a length of the content of the content item. For instance, the area may extend from a first side representative of a beginning of the length of content to a second side representative of an end of the length of content.

At 3706, in the consumption representation, the electronic device may visually distinguish multiple noncontiguous portions of content that have been consumed. For example, the electronic device may track the consumption of the content of the content item and may keep a log or other records of which portions of the content item have been consumed. As portions of content are consumed, the electronic device may update the representation to indicate that those portions of content have been consumed. Thus, when a user consumes content in a nonlinear or noncontiguous manner the consumption representation may provide an indication of this by visually distinguishing noncontiguous portions of the representation.

Figure 38:
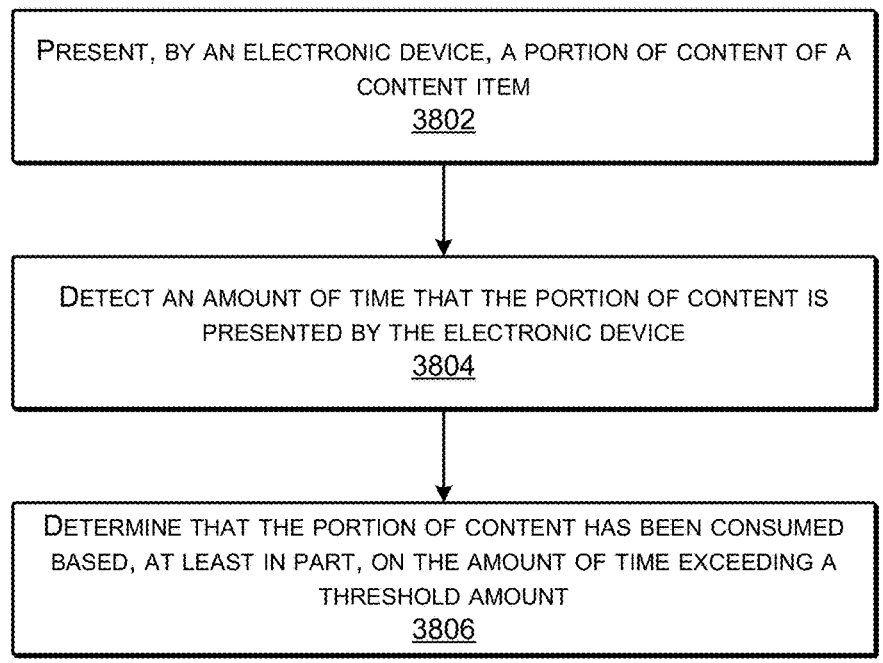
FIG. 38 is a flow diagram illustrating an example process that may be executed by an electronic device for determining that a portion of content has been consumed according to some implementations.

FIG. 38 is a flow diagram illustrating an example process that may be executed by an electronic device for determining that a portion of content has been consumed according to some implementations.

At 3802, the electronic device may present a portion of content of a content item. For example, the electronic device may display a page of an eBook, a clip of a video, or may play a portion of audio content.

At 3804, the electronic device may detect or otherwise determine an amount of time that the portion of content is presented on the electronic device. For example, the electronic device may use a clock, such as a processor clock, or the like, to measure the amount of time that the portion of content is displayed on the electronic device.

At 3806, the electronic device may determine that the portion of content has been consumed based at least in part on a determination that the amount of time that the portion of content has been presented exceeds a threshold amount. For instance, as discussed above, various thresholds may be established for determining whether content has been presented a sufficient amount of time to qualify as having been consumed. In some examples, the threshold may vary depending at least in part on the amount of content in the portion being presented. Further, as discussed above, in some instances a trained classifier may be applied to determine whether to classify a portion of content as having been consumed or not.

FIG. 39 is a flow diagram illustrating an example process that may be executed by a computing device of a content provider in connection with providing aggregated consumption information for a content item according to some implementations herein.

At 3902, the computing device receives, from a plurality of devices associated with a plurality of different user accounts, consumption information identifying consumption of noncontiguous portions of content of a content item. For example, the computing device may receive nonlinear consumption information for a particular content item from a plurality of different devices corresponding to a plurality of different users.

At 3904, the computing device compares the consumption information received from the plurality of devices to determine one or more portions of content of the content item that have been consumed more frequently than other portions of content. For example, the computing device may merge the consumption information received from the plurality of devices to identify those portions of content that have been accessed most frequently.

At 3906, the computing device may present a representation of aggregated consumption information for the taken the content item. For example, the representation of aggregated consumption information may indicate at least one portion of content consumed more frequently than other portions of the content item.

Figure 40:
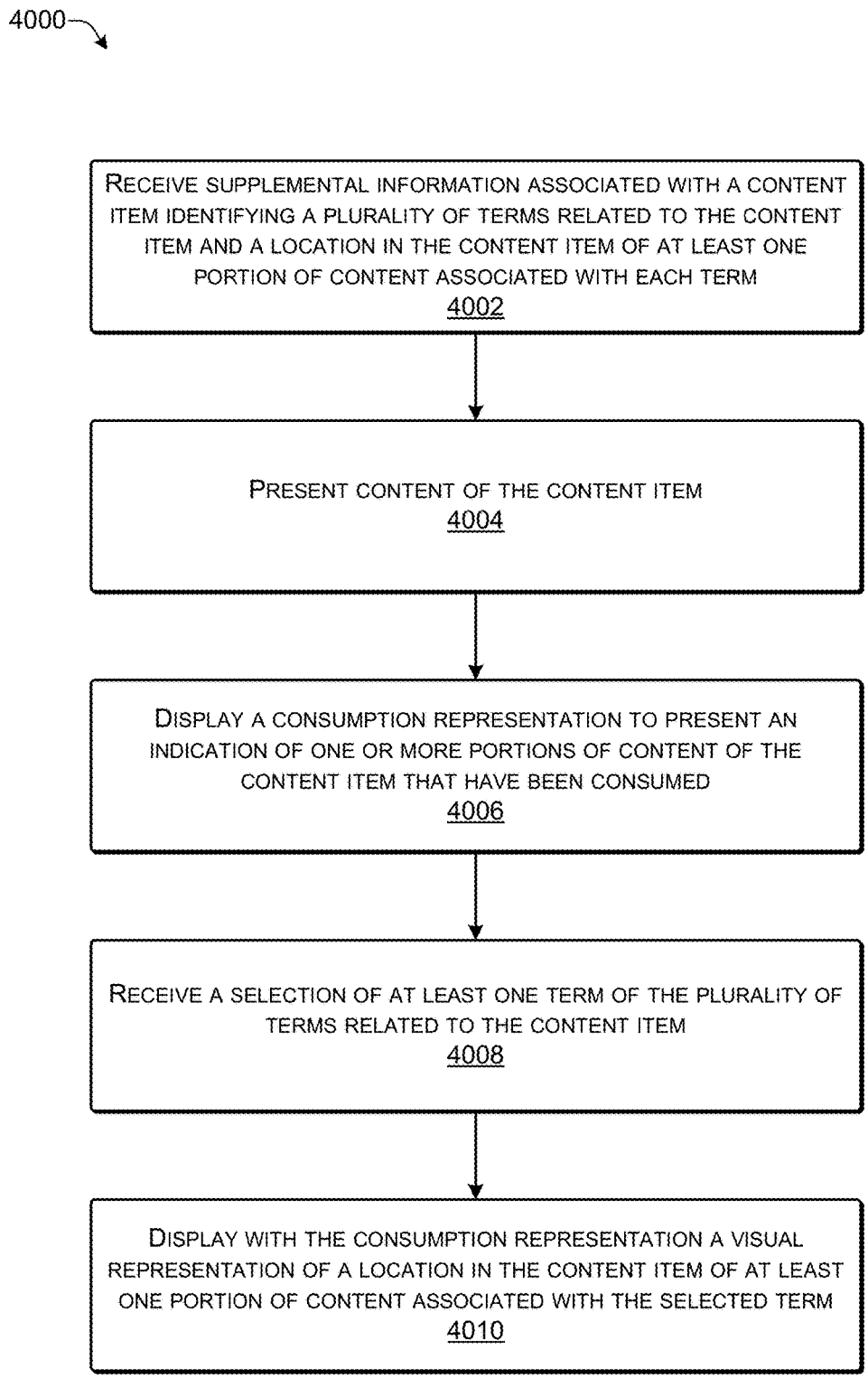
FIG. 40 is a flow diagram illustrating an example process that may be executed by an electronic device for providing a consumption representation with a visual representation of supplemental information for a content item according to some implementations.

FIG. 40 is a flow diagram illustrating an example process that may be executed by an electronic device for providing a consumption representation with a visual representation of supplemental information for a content item according to some implementations.

At 4002, the electronic device receives supplemental information associated with a content item that identifies a plurality of terms related to the content item and a location in the content item of at least one portion of content associated with each term. For example, the supplemental information may identify portions of the content item associated with terms such as characters, places, things, phrases, and the like, that occur in the content item.

At 4004, the electronic device may present content of the content item on a display or the like.

At 4006, the electronic device may display a consumption representation to present an indication of one or more portions of content of the content item that have been consumed by the user.

At 4008, the electronic device may receive a selection of at least one term of the plurality of terms related to the content item. For example, the user may select a term by highlighting a term on a page of the content item or by accessing an interface, as described with respect to FIG. 28, to select one or more of the terms included in the supplemental information.

At 4010, the electronic device may display with the consumption representation a visual representation of a location in the content item of at least one portion of content associated with the selected term. For example, the electronic device may display a visual representation overlaid on the consumption representation or adjacent to the consumption representation that indicates one or more locations in the content item of text associated with the selected term.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more non-transitory computer-readable media maintaining instructions executable by one or more processors to perform operations comprising:
   receiving supplemental information associated with a content item that includes a plurality of pages, the supplemental information identifying a plurality of terms related to the content item;
   presenting content of the content item on a display of an electronic device;
   determining that pages of the content item have been consumed using the electronic device;
   displaying a consumption representation, the consumption representation including a graphic element comprising a bar that represents at least a part of the content item;
   visually distinguishing a first portion and a second portion of the consumption representation based, at least in part, on the determining that the pages of the content item have been consumed using the electronic device, wherein the first portion is noncontiguous from the second portion;
   displaying an indicator with the consumption representation, the indicator indicating a location in the content item of embedded content, wherein the indicator visually represents a type of the embedded data at the location in the content item;
   receiving a selection of at least one term of the plurality of terms related to the content item; and
   displaying, with the consumption representation, a visual representation of a location in the content item of at least one page of the content item associated with the at least one term.

2. The one or more non-transitory computer-readable media as recited in claim 1, wherein the first portion of the consumption representation indicates a location of a page of the pages that has been consumed.

3. The one or more non-transitory computer-readable media as recited in claim 1, wherein the plurality of terms related to the content item include at least one of:
   a character mentioned in the content item;
   a person mentioned in the content item;
   a place mentioned in the content item;
   a thing mentioned in the content item;
   an interaction between characters in the content item;
   an organization or group mentioned in the content item;
   a relationship between characters in the content item;
   a theme in the content item;
   a scene in the content item;
   an event mentioned in the content item;
   a phrase used in the content item;
   a topic mentioned in the content item;
   a citation provided in the content item; or
   a time period associated with the content item.

4. The one or more non-transitory computer-readable media as recited in claim 1, wherein the type of the embedded data includes at least one of: video content, audio content, or linked content.

5. The one or more non-transitory computer-readable media as recited in claim 1, the operations further comprising:
   determining that at least a page of the plurality of pages of the content item has been accessed using the electronic device, and
   visually distinguishing a third portion of the consumption representation that represents the page of the content item from a fourth portion of the consumption representation that represents at least one other page of the content item.

6. The one or more non-transitory computer-readable media as recited in claim 1, the operations further comprising:
   determining that at least a page of the plurality of pages of the content item that has been displayed using the electronic device for a threshold period of time, and
   visually distinguishing a third portion of the consumption representation that represents the page of the content item from a fourth portion of the consumption representation that represents at least one other page of the content item.

7. A method comprising:
   under control of one or more processors configured with executable instructions,
   displaying a representation of a content item;
   determining that portions of the content item have been consumed using an electronic device;
   visually distinguishing a first portion that is noncontiguous with a second portion of the representation; and
   displaying an indicator with the representation, the indicator indicating a location in the content item of embedded content, wherein the indicator visually represents a type of the embedded data at the location in the content item.

8. The method as recited in claim 7, wherein the visually distinguishing further comprises visually distinguishing the first portion of the representation in a manner different from visually distinguishing the second portion of the representation to indicate that content corresponding to the first portion was consumed at least one of more frequently or for a greater length of time than content corresponding to the second portion.

9. The method as recited in claim 7, wherein: the representation comprises a bar representative of the content item.

10. The method as recited in claim 9, wherein at least the first portion is located at a position on the bar that is proportional to a location of a corresponding page that has been consumed in the content item between a first page of the content item and a last page of the content item.

11. The method as recited in claim 9, wherein at least the first portion is located at a position on the bar that is proportional to a location of elapsed play time at which a consumed portion of the content item has been played out of a total play time of the content item.

12. The method as recited in claim 7, wherein the type of the embedded data includes at least one of: video content, audio content, or linked content.

13. The method as recited in claim 12, wherein the indicator further indicates a consumption status of the at least one of the video content, the audio content, or the linked content.

14. The method as recited in claim 13, wherein the consumption status is indicated by at least one of:
  one or more bars;
  a pie chart;
  a consumption representation, within the representation, wherein the consumption representation is able to represent noncontiguous consumption of the content corresponding to the indicator;
  a numeric percentage; or
  an icon indicating completion of consumption of the content corresponding to the indicator.

15. The method as recited in claim 7, further comprising displaying, with the representation, an indicator of a location in the content item of at least one of:
  content that has been flagged to be corrected, updated or removed;
  content that is missing;
  content that is to be completed;
  content that has been annotated;
  content that has been highlighted;
  content that is trending on one or more social networks; or
  one or more chapter breaks.

16. The method as recited in claim 7, further comprising sending, over a network, consumption information indicating the portions of the content item during presentation of the content item.

17. The method as recited in claim 7, wherein the electronic device comprises a first electronic device, and the representation of the content item is displayed on the first electronic device, the method further comprising:
  receiving, over a network, consumption information indicating an additional portion of the content item that has been consumed during presentation of the content item on a second electronic device; and
  visually distinguishing, on the first electronic device, a portion of the representation corresponding to the additional portion of the content item.

18. The method as recited in claim 7, further comprising:
  receiving a selection of the first portion of the representation; and
  displaying information identifying a range of content of the content item corresponding to the first portion.

19. The method as recited in claim 7, wherein:
  at least a portion of the content item is scrollable content having an associated scrollbar; and
  the representation is at least one of:
    located adjacent to the scrollbar; or
    overlaid on the scrollbar.

20. The method as recited in claim 7, wherein:
  the content item comprises at least one page that includes a plurality of text items and a plurality of media items, the plurality of media items including at least one of video or audio items;
  the first portion of the representation corresponds to one of the text items; and
  the second portion of the representation corresponds to one of the media items.

21. The method as recited in claim 7, wherein:
  the content item comprises at least a first page and a second page, the first portion including the first page and the second portion including the second page;
  the representation includes at least a first thumbnail image corresponding to the first portion and a second thumbnail image corresponding to the second portion; and
  the visually distinguishing the first portion that is noncontiguous with the second portion of the representation comprises visually distinguishing the first thumbnail image corresponding to the first portion of the content item and visually distinguishing the second thumbnail image corresponding to the second portion of the content item.

22. A device comprising:
  a display;
  one or more processors;
  one or more non-transitory computer-readable media; and
  one or more modules maintained on the one or more non-transitory computer-readable media and executed by the one or more processors to present a visual representation that represents consumption of content of a content item using the device, the visual representation including:
    a bar representative of the content item;
    a first visually distinguished portion of the bar at a first location proportional to a location of a first page of content in the content item, the first page of content having been determined to have been consumed using at least one of the device or another device;
    a second visually distinguished portion of the bar located at a second location proportional to a location of a second page of content in the content item, the second page of content having been determined to have been consumed using at least one of the device or the another device, wherein the first visually distinguished portion of the bar is separate from the second visually distinguished portion of the bar; and
    an indicator, the indicator indicating a location in the content item of embedded content, wherein the indicator visually represents a type of the embedded data at the location in the content item.

23. The device as recited in claim 22, wherein the one or more modules determine that at least one of the first page of content or the second page of content has been consumed based at least in part on at least one of:
  an amount of time that the at least one of the first page of content or the second page of content is presented on the device;
  a detected gaze of a user;
  a location of a currently presented page of content; or
  a furthest location at which content has been presented.

24. The device as recited in claim 22, at least one of: video content, audio content, or linked content.

25. The device as recited in claim 22, wherein the first visually distinguished portion of the bar is visually distinguished from the second visually distinguished portion of the bar to indicate that the content corresponding to the first visually distinguished portion was consumed at least one of more frequently or for a greater length of time than the content corresponding to the second visually distinguished portion.

26. One or more non-transitory computer-readable media maintaining instructions executable by one or more processors to perform operations comprising:
- determining that a first page and a second page of a content item have been consumed using an electronic device;
- displaying a consumption representation to visually distinguish a first location in the electronic book of the first page and a second location in the electronic book of the second page that have been consumed using the electronic device from an additional location in the electronic book of one or more additional pages; and
- displaying, with the consumption representation, an indicator of a third location in the electronic book of embedded content, wherein the indicator visually represents a type of the embedded data at the third location in the electronic book.

27. The one or more non-transitory computer-readable media as recited in claim 26, wherein the type of the embedded data includes at least one of: video content, audio content, or linked content.

\* \* \* \* \*